(12) United States Patent
Aagaard et al.

(10) Patent No.: US 10,183,786 B2
(45) Date of Patent: Jan. 22, 2019

(54) CLOSURE FOR A PRODUCT-RETAINING CONTAINER

(71) Applicant: Nomacorc LLC, Zebulon, NC (US)

(72) Inventors: Olav Marcus Aagaard, Rotterdam (NL); Mohammad Reza Sadeghi, Raleigh, NC (US); Malcolm Joseph Thompson, Raleigh, NC (US)

(73) Assignee: VINVENTIONS USA, LLC, Zebulon, NC (US)

( * ) Notice: Subject to any disclaimer, the term of this patent is extended or adjusted under 35 U.S.C. 154(b) by 0 days.

(21) Appl. No.: 14/819,747

(22) Filed: Aug. 6, 2015

(65) Prior Publication Data

US 2016/0039577 A1    Feb. 11, 2016

Related U.S. Application Data

(60) Provisional application No. 62/034,689, filed on Aug. 7, 2014.

(51) Int. Cl.
*B65D 39/00* (2006.01)
*B29D 99/00* (2010.01)

(52) U.S. Cl.
CPC ..... *B65D 39/0029* (2013.01); *B29D 99/0096* (2013.01); *B65D 39/0011* (2013.01); *B65D 2539/008* (2013.01)

(58) Field of Classification Search
CPC ............ B65D 39/0029; B65D 39/0011; B65D 2539/008; B29D 99/0096
USPC ..... 220/787, 789, 800, 801, 203.13, 203.14; 215/355–364; 427/332, 323; 264/219, 264/450

See application file for complete search history.

(56) References Cited

U.S. PATENT DOCUMENTS

| | | | | |
|---|---|---|---|---|
| 3,392,859 A | * | 7/1968 | Fischer | B65D 51/002 215/247 |
| 4,437,231 A | * | 3/1984 | Zupancic | H01M 2/1235 220/364 |
| 4,441,621 A | * | 4/1984 | Matukura | B65D 39/00 215/247 |

(Continued)

FOREIGN PATENT DOCUMENTS

| | | |
|---|---|---|
| WO | 0026103 A1 | 5/2000 |
| WO | 03/018304 A1 | 3/2003 |

(Continued)

OTHER PUBLICATIONS

International Search Report and Written Opinion for International Patent Application No. PCT/EP2015/067906, dated Oct. 30, 2015, 10 pages.

(Continued)

*Primary Examiner* — Kareen Thomas
(74) *Attorney, Agent, or Firm* — Withrow & Terranova, P.L.L.C.

(57) ABSTRACT

The disclosure relates to a cylindrical closure for a product-retaining container constructed for being inserted and securely retained in a portal-forming neck of said container, said closure comprising at least one thermoplastic polymer and at least one natural organic filler wherein the lateral surface of said closure has a hardness of 40 to 90 Shore A. Such closures are particularly suitable for sealingly closing wine bottles.

70 Claims, 1 Drawing Sheet

(56) References Cited

U.S. PATENT DOCUMENTS

| | | | | |
|---|---|---|---|---|
| 5,119,955 | A | * | 6/1992 | Granofsky ........... B65D 17/506 220/254.2 |
| 5,317,047 | A | | 5/1994 | Sabate et al. |
| 6,221,451 | B1 | * | 4/2001 | Lauer ....................... B32B 5/18 428/36.5 |
| 7,770,747 | B2 | * | 8/2010 | Lauer ................ B65D 39/0005 215/299 |
| 8,063,163 | B2 | | 11/2011 | Hatke et al. |
| 8,499,957 | B2 | * | 8/2013 | Kawachi ............... A61J 1/1406 215/355 |
| 2006/0175280 | A1 | * | 8/2006 | Anraku .............. B01L 3/50825 215/247 |
| 2010/0206836 | A1 | * | 8/2010 | Koshidaka ......... B65D 39/0023 215/355 |
| 2010/0304357 | A1 | * | 12/2010 | Meyers .................... A61J 11/04 435/4 |
| 2012/0168439 | A1 | | 7/2012 | Quigley et al. |
| 2014/0224759 | A1 | * | 8/2014 | Aagaard ............ B65D 39/0011 215/43 |
| 2015/0284527 | A1 | * | 10/2015 | King ...................... C08J 9/0061 521/97 |

FOREIGN PATENT DOCUMENTS

| | | |
|---|---|---|
| WO | 2008/113608 A2 | 9/2008 |
| WO | 2010132632 A1 | 11/2010 |

OTHER PUBLICATIONS

International Preliminary Report on Patentability for International Patent Application No. PCT/EP2015/067906, dated Feb. 7, 2017, 7 pages.

Observations by a Third Party for European Patent Application No. 15745213.7, dated Nov. 22, 2017, 4 pages.

Examination Report for European Patent Application No. 15745213.7, dated Jan. 26, 2018, 5 pages.

Examination Report for European Patent Application No. 15745213.7, dated Oct. 2, 2018, 4 pages.

* cited by examiner

CLOSURE FOR A PRODUCT-RETAINING CONTAINER

STATEMENT OF RELATED APPLICATION(S)

This application is a non-provisional of U.S. Provisional Patent Application No. 62/034,689 filed on Aug. 7, 2014. The entire contents of the foregoing provisional application are hereby incorporated by reference as if set forth fully herein.

TECHNICAL FIELD

The present disclosure relates to a closure for a product retaining container, to a method of preparing a closure for a product retaining container, to a closure that is obtainable by a method of the present disclosure, and to a use of the disclosed closure for sealingly closing a product-retaining container.

BACKGROUND

In view of the wide variety of products that are sold for being dispensed from containers, particularly containers with round necks which define the dispensing portal, numerous constructions have evolved for container stoppers or closure means for the portals, including for example screw caps, stoppers, corks and crown caps, to name a few. Generally, products such as vinegar, vegetable oils, laboratory liquids, detergents, honey, condiments, spices, alcoholic beverages, and the like, have similar needs regarding the type and construction of the closure means used for containers for these products. However, wine sold in bottles represents the most demanding product in terms of bottle closure technology. In an attempt to best meet these demands, most wine bottle closures or stoppers have been produced from a natural material known as "cork."

While natural cork still remains a dominant material for wine closures, wine closures from alternative materials such as polymers have become increasingly popular over the last years, largely due to the shortage in high quality natural cork material and the awareness of wine spoilage as a result of "cork taint," a phenomenon that is associated with natural cork materials. In addition, these closures from alternative materials such as polymers have the advantage that by means of closure technology, their material content and physical characteristics can be designed, controlled and fine-tuned to satisfy the varying demands that the wide range of different wine types produced throughout the world impose on closures.

One of the principal difficulties to which any bottle closure is subjected in the wine industry is the manner in which the closure is inserted into the bottle. Typically, the closure is placed in a jaw clamping member positioned above the bottle portal. The clamping member incorporates a plurality of separate and independent jaw members which peripherally surround the closure member and are movable relative to each other to compress the closure member to a diameter substantially less than its original diameter. Once the closure member has been fully compressed, a plunger moves the closure means from the jaws directly into the neck of the bottle, where the closure member is capable of expanding into engagement with the interior diameter of the bottle neck and portal, thereby sealing the bottle and the contents thereof.

In view of the fact that the jaw members are generally independent of each other and separately movable in order to enable the closure member to be compressed to the substantially reduced diameter, each jaw member comprises a sharp edge which is brought into direct engagement with the closure member when the closure member is fully compressed. Score lines are frequently formed on the outer surface of the closure member, which prevents a complete, leak-free seal from being created when the closure member expands into engagement with the bottle neck. This can occur, for example, if the jaw members of the bottling equipment are imperfectly adjusted or worn. Leakage of the product, particularly of liquid product, from the container can thus occur.

Thus, it is generally desirable that any bottle closure be able to withstand this conventional bottling and sealing method. Furthermore, many cork sealing members also incur damage during the bottling process, resulting in leakage or tainted wine.

Another issue in the wine industry is the capability of the wine stopper to withstand a pressure build up that can occur during the storage of the wine product after it has been bottled and sealed. Due to natural expansion of the wine during hotter months, pressure builds up, which can result in the bottle stopper being displaced from the bottle. As a result, it is generally desirable that the bottle stopper employed for wine products be capable of secure, intimate, frictional engagement with the bottle neck in order to resist any such pressure build up.

A further issue in the wine industry is the general desirability that secure, sealed engagement of the stopper with the neck of the bottle be achieved quickly, if not virtually immediately after the stopper is inserted into the neck of the bottle. During normal wine processing, the stopper is compressed, as detailed above, and inserted into the neck of the bottle to enable the stopper to expand in place and seal the bottle. However, such expansion desirably occurs immediately upon insertion into the bottle since many processors tip the bottle onto its side or neck down after the stopper is inserted into the bottle neck, allowing the bottle to remain stored in this position for extended periods of time. If the stopper is unable to rapidly expand into secure, intimate, frictional contact and engagement with the walls of the neck of the bottle, wine leakage can occur.

It is further desirable that the closure be removable from the bottle using a reasonable extraction force. Although actual extraction forces extend over a wide range, the generally accepted, conventional extraction force is typically below 100 pounds (445 Newtons).

In achieving a commercially viable stopper or closure, a careful balance must be made between secure sealing and providing a reasonable extraction force for removal of the closure from the bottle. Since these two characteristics are believed to be in direct opposition to each other, a careful balance must be achieved so that the stopper or closure is capable of securely sealing the product, in particular the wine in the bottle, preventing or at least reducing both leakage and gas transmission, while also being removable from the bottle without requiring an excessive extraction force.

Furthermore, it is generally desirable to effectively prevent or reduce oxygen from entering the bottle. Too much oxygen can cause the premature spoilage of wine. In fact, oxidation may occur over a period of time to render the beverage undrinkable. Thus, it is desirable that the closure has a low oxygen permeability in order to extend and preserve the freshness and shelf life of the product. Apart from reducing the oxygen permeability of the closure, additives that act as oxygen scavengers can be incorporated into the closure. Oxygen migrating through the closure is then quenched by the additive. A combination of a low oxygen permeability and oxygen scavengers inside the closure is particularly effective at reducing oxygen-mediated spoilage of wine. Any commercially viable wine stopper or closure should therefore generally have a low oxygen transfer rate (OTR).

In addition to the above, it is also desirable, for economic and environmental reasons, to reduce the total amount of material in a closure from alternative materials such as polymers, particularly the amount of polymer material. Since the size of the closure is determined by the size of the bottle neck, reducing the amount of material can principally be achieved by reducing the density of the closure, in particular of the core member, which is generally in the form of a foamed material comprising air- or gas-filled cells. However, reducing the density of the core member generally increases the deformability of the core member and thus of the closure, which in turn results in a worsened sealing capability and thus in increased leakage. In order to avoid this, a thicker and/or denser outer layer or skin is conceivable, as is the incorporation of a stiffer and/or denser central element within the core member. However, either of these approaches increases the total amount of material, thereby diminishing or even eliminating any advantages achieved by reducing the core density. It is also possible to reduce the amount of polymer material by using filler material. Closures are known which incorporate fibers into a polymer matrix. For example, U.S. Pat. No. 5,317,047 describes a stopper made of expandable microspheres, cork powder, and a binder such as a polyurethane or acrylic type glue. The preparation method for closures incorporating cork powder in a polyurethane or acrylic matrix generally involves combining the cork powder with polyurethane or acrylic monomers, oligomers, or prepolymers, and polymerizing in situ. However, residual monomers and low molecular weight compounds such as dimers, trimers, and other oligomers, remain in the matrix and/or in the cork powder. These residual monomers and low molecular weight compounds may not be compatible with food safety considerations, since they can migrate into food products which are in contact with the closure. International Patent Application Publication No. WO 2008/113608 describes closures made of wound cork leafs held together by a bonding agent. Since these closures mainly consist of cork, it is difficult to tailor the properties of the closure to the specific needs of the respective container. U.S. Patent Application Publication No. 2012/0168439 A1 describes a container with a closure for wet environments such as showers employing a wet friction material. The wet friction material can display a hardness from 5 to about 95 Shore A and a coefficient of friction of about 2.0 to 5.3 and does not contain a natural organic filler.

It would be advantageous to be able to control the properties of a closure incorporating filler material, in particular natural organic filler material, in the same way as a closure consisting essentially of one material such as polymer or cork. It would be particularly advantageous to be able to achieve homogeneous properties within such a closure. It would also be advantageous to be able to ensure that the desirable properties for such a closure, for example making it suitable as a closure for a wine bottle, as described herein, are achievable in industrial scale production without significant deviation for individual closures.

According to the present disclosure, natural organic filler preferably means a biodegradable filler material that is obtained from a natural organic material or from a mixture of natural organic materials, which are normally of vegetable origin, with the exception of cork.

In addition to the above, it is often desirable for closures not made of cork to resemble natural cork closures as closely as possible in appearance. Both the longitudinal surface and the flat ends of cylindrical cork closures generally have an irregular appearance, for example showing naturally occurring irregularities in color, structure and profile. Methods have been developed for providing closures from alternative materials such as polymers with a physical appearance similar to natural cork, for example by blending colors to produce a streaking effect in the outer portion of the closure, along the cylindrical axis, or to provide the flat terminating ends of a closure from alternative materials such as polymers with a physical appearance similar to natural cork.

Many industries dealing with natural products and/or natural organic materials, such as the wood industry or the agricultural industry generate large quantities of by-products, for example sawdust or rice straw, that are often considered waste products. It would be advantageous to transform these by-products into a high value composite product. It is known to incorporate natural organic filler materials into composites with polymers. The incorporation of natural organic fillers into a polymer matrix can, however, be detrimental to the processing and performance properties thereof. Composites comprising large amounts of natural organic fillers, for example more than about 50 wt. % thereof, based on the total weight of the composite, tend to have properties such as hardness, density and permeability which make them unsuitable as closures for wine bottles. In addition, crosslinkers and/or compatibilizers are often required in order to improve properties. However, these crosslinkers and/or compatibilizers can raise issues of food safety when used in products which come into contact with foodstuffs. Moreover, natural organic fillers can contain and release substances that affect the sensory perception of food when used in bulk or in composites as packaging material. Examples for such substances are sensory constituents such as phenolic compounds, for example polyphenols, flavonoids, for example proanthocyanidins, and tannins. In addition, natural organic filler materials can have a negative influence on the printability of the resulting composite materials due to low ink absorption. This poses a challenge to employing a natural organic filler component in a closure without deteriorating or spoiling food when the closure is used as a packaging material. In addition, a closure containing the natural organic filler should still provide good mechanical properties, and should not impair printing on the resulting surface. It would be advantageous for a closure to overcome these problems as far as possible.

In addition to the above, it is also desirable, for environmental reasons, that closures made from alternative materials such as polymers are biodegradable. Biodegradable objects are not necessarily made entirely from non-fossil resources. In fact, there are a number of polymers made from fossil resources that can be metabolized, for example by microorganisms, due to their chemical structure. Many polyesters, such as poly(caprolactone) or poly(butylenadipate-co-terephthalate), are made from fossil resources and are biodegradable.

It is, furthermore, often desirable to provide decorative indicia such as letters and ornaments on the surface of wine stoppers (e.g. the crest or emblem of a winery). Natural corks are generally marked by a method commonly referred to as "fire branding," i.e., by the application of a hot branding tool. Alternatively, natural corks may also be branded by application of colors or dyes. Due to food safety concerns, marking of natural corks with colors or dyes is generally only effected on the curved cylindrical surface of the cork that is not in direct contact with the wine. On the other hand, marking on the flat terminating surfaces of natural corks is generally effected by means of fire branding only since this method does not impose any food safety concerns.

It is also known to brand closures from alternative materials such as polymers. These closures are commonly branded by means of inkjet or offset printing using special dyes or colors approved for indirect food contact. Since such colors and dyes are normally not approved for direct food contact, marking of closures with colors or dyes is generally only effected on the curved cylindrical surface of the closure that is not in direct contact with the wine. Such marking can be on the outermost surface, or on an inner surface which is subsequently covered with an outer, preferably substantially transparent, layer. Marking on the flat terminating surfaces of closures from alternative materials such as polymers is generally only known for injection molded closures, where marking is effected during the molding process of the closure by providing raised portions on the flat terminating surfaces.

Methods are available for marking the flat terminating surface of closures from alternative materials such as polymers that have been manufactured by means of extrusion, in particular by co-extrusion. Laser marking may, in theory, be a feasible method since it allows the avoidance of direct food contact. This method is, however, inherently slow and expensive since it requires the use of special laser dye additives. Also, there have been concerns that laser marking of the flat terminating surfaces of these kinds of closures may adversely change the foam structure of the core element, which may, in consequence, adversely affect the sensitive gas permeation properties of such closures.

A further method involves the application of a decorative layer, in particular of a decorative polymer layer, by means of heat and/or pressure transfer. This method allows for permanent branding of closures from alternative materials without giving rise to concerns relating to food safety and without negatively impacting the gas permeation and/or mechanical properties of closures from alternative materials such as polymers, in particular when they were obtained by co-extrusion.

Therefore, there exists a need for a closure or stopper which particularly comprises at least one of the characteristic features described above, said closure or stopper having a physical appearance and/or tactile characteristics similar in at least one aspect to a natural cork closure, said closure being biodegradable, particularly with only minimal impairment, particularly with no impairment or even with improvement of the other properties of the closure such as, inter alia, OTR, leakage, ease of insertion and removal, compressibility and compression recovery, and/or compatibility with food products.

Other and more specific needs will in part be apparent and will in part appear hereinafter.

SUMMARY

As will become evident from the following detailed disclosure, the closure of the present disclosure may be employed as a bottle closure or stopper for any desired product. However, for the reasons detailed above, wine products impose the most burdensome standards on a bottle closure. Consequently, in order to clearly demonstrate the universal applicability of the closure of the present disclosure, the following disclosure focuses on the applicability and usability of the closure of the present disclosure as a closure or stopper for wine containing bottles. However, this discussion is for exemplary purposes only and is not intended as a limitation of the present disclosure.

As discussed above, a bottle closure or stopper for wine must be capable of performing numerous separate and distinct functions. One principal function is the ability to withstand the pressure build up due to temperature variations during storage, as well as prevent any seepage or leakage of the wine from the bottle. Furthermore, a tight seal must also be established to prevent unwanted gas exchange between ambient conditions and the bottle interior, so as to prevent any unwanted oxidation or permeation of gases from the wine to the atmosphere. In addition, the unique corking procedures employed in the wine industry also impart substantial restrictions on the bottle closure, requiring a bottle closure which is highly compressible, has high immediate compression recovery capabilities and can resist any deleterious effects caused by the clamping jaws of the bottle closure equipment. Moreover, the closure should be biodegradable to help reduce the amount of slowly decomposing waste. In addition, the tactile properties and/or the physical appearance should be similar to a natural cork closure. Most importantly, the contained product, in this case wine, should not be spoiled by the closure.

Although prior art products have been produced in an attempt to satisfy the need for alternate bottle closures employable in the wine industry, such prior art systems have often been found lacking in one or more of the generally desirable aspects of a bottle closure for wine products. However, by employing the present disclosure, many of the prior art disadvantages have been reduced or even obviated and an effective, easily employed, mass-produced closure has been realized.

In accordance with the present disclosure, a closure is provided that comprises at least one thermoplastic polymer and a natural organic filler. Surprisingly, the incorporation of a natural organic filler into a polymer closure did not lead to tainting of the wine. In addition, the incorporated natural organic filler did not impair the printability of the surface of the resulting closure. Moreover, in combination with biodegradable polymers, these polymer—natural organic filler composite closures are biodegradable, making this type of closure environmentally friendly. Insertion of the closure into the container was not deteriorated by the incorporation of a natural organic filler into the closure, as the compressibility and the recovery capabilities were substantially unaltered compared to a pure polymer closure. The sealing properties of the closure were also substantially not affected by the incorporation of a cheap natural organic filler. At the same time, the extraction force required to remove the closure from the bottle was not altered substantially. In addition, the closure resembled a natural cork closure in its physical appearance. Furthermore, the tactile properties of the closure were very similar to a closure from natural cork.

Therefore, in the present disclosure, many of the prior art disadvantages can be reduced or even overcome by achieving a closure for a product retaining container constructed for being inserted and securely retained in a portal forming neck of said container and methods for producing such a closure.

In one aspect the present disclosure provides for a cylindrical closure for a product-retaining container constructed for being inserted and securely retained in a portal-forming neck of said container, said closure comprising at least one thermoplastic polymer and at least one natural organic filler, wherein the lateral surface of said closure has a hardness of 40 to 90 Shore A according to ASTM International standard ("ASTM") D2240-10 and/or wherein the dynamic coefficient of friction of the lateral surface of said closure is from 0.35 to 0.7 according to ASTM D1894-14. Preferably, the lateral surface of the closure according to the disclosure has a hardness according to ASTM D2240-10 of 50 to 85 Shore A, more preferably from 60 to 80 Shore A. Advantageously, the dynamic coefficient of friction of the lateral surface of the closure according to the disclosure is from 0.38 to 0.67, preferably from 0.4 to 0.65, according to ASTM D1894-14.

The hardness of the lateral surface can be determined according to the test method described herein. The dynamic coefficient of friction can be determined according to the test method described herein.

Natural organic filler according to the present disclosure preferably means a biodegradable filler material that is obtained from a natural organic material or from a mixture of natural organic materials, which are normally of vegetable origin, with the exception of cork.

The closure according to the present disclosure or produced according to a method according to the present disclosure advantageously has a surface roughness $R_a$ measured by contact profilometry in the range of from 0.5 µm to 17 µm, particularly in the range of from 0.5 µm to 16 µm, particularly from 0.5 µm to 15 µm, particularly in the range of from 1 µm to 15 µm, particularly in the range of from 1 µm to 14 µm, 13 µm, 12 µm, 11 µm or 10 µm, particularly in the range of from 1 µm to 10 µm, particularly in the range of from 1 µm to 9 µm. A surface roughness in this range is achievable because of the use of a natural organic filler with small particle sizes, rather than a natural organic filler consisting of large particles. A surface roughness in this range allows for an efficient printing. The surface roughness $R_a$ is the arithmetic average of the absolute measured values. Methods to determine the surface roughness $R_a$ are known to the skilled person.

The closure according to the present disclosure particularly has a substantially cylindrical shape comprising substantially flat terminating surfaces forming the opposed ends of said closure. The closure has a substantially cylindrical form comprising a substantially cylindrical peripheral surface and two substantially flat terminating faces at the opposing ends of the cylindrical form. The ends of the closure can be beveled or chamfered, as is known from the prior art. Although any desired bevel or chamfered configuration can be employed, such as a radius, curve, or flat surface, it has been found that merely cutting the terminating ends at the intersection with the longitudinal cylindrical surface of the elongated length of material at an angle in the range of from about 30° to about 75°, for example in the range of from about 35° to about 70°, particularly in the range of from about 40° to about 65°, allows formation of a closure which is easier to insert into the neck of a container. Angles of about 45°, 46°, 47°, 48°, 49°, 50°, 51°, 52°, 53°, 54°, 55°, 56°, 57°, 58°, 59° or 60° have been found particularly to contribute to the present disclosure. The bevel or chamfer angle is measured relative to the longitudinal axis of the cylindrical closure. The chamfer angle for a closure for a still wine bottle is particularly within the above ranges, particularly with a chamfer length in the range of from about 0.4 mm to about 2.5 mm, particularly in the range of from about 0.5 mm to about 2.0 mm. Closures for sparkling wine bottles advantageously have a chamfer in the above range, but generally have a deeper and/or longer chamfer than closures for still wine bottles, for example having a chamfer angle in the range of from about 35° to about 55°, particularly in the range of from about 40° to about 50°, more particularly a chamfer angle of about 40°, 41°, 42°, 43°, 44°, 45°, 46°, 47°, 48°, 49° or 50°, and/or a chamfer length in the range of from about 3 mm to about 8 mm, particularly in the range of from about 4 mm to about 7 mm, particularly a chamfer length of about 3 mm, 4 mm, 5 mm, 6 mm, 7 mm or 8 mm. In addition, an end cap can be attached to one of said flat terminating surfaces of the closure. Said end cap can be made from any material, preferably from a plastic material. Preferably, the end cap has a circular cross-section with a diameter larger than the diameter of the closure.

The closure according to the present disclosure has advantageous properties making it particularly suitable for packaging and in particular for use as a closure for wine bottles. If the product is packaged under inert conditions, the closure advantageously has an oxygen ingress rate of less than about 3 mg oxygen per container in the first 100 days after closing the container, whereby the oxygen ingress rate is advantageously selected from the group consisting of less than about 1 mg oxygen, less than about 0.5 mg oxygen, less than about 0.25 mg oxygen, less than about 0.2 mg oxygen and less than about 0.1 mg oxygen, per container in the first 100 days after closing the container. The closure according to the present disclosure or produced according to the methods of the present disclosure achieves at least a comparable performance to known closures from alternative materials such as polymers with respect to use as a closure for wine bottles, as measured by, for example, at least one of, particularly more than one of, particularly all of the properties of oxygen transfer rate, extraction force, and leakage. In addition, the closure according to the present disclosure or produced according to the methods of the present disclosure has an appearance resembling that of natural cork and can in some aspects be branded in the same way as a natural cork closure. Furthermore, the tactile properties of the closure according to the present disclosure are very similar to a closure from natural cork.

According to a particular aspect of the present disclosure the closure has an overall density of from about 100 kg/m³ to about 800 kg/m³, in particular from about 150 kg/m³ to about 500 kg/m³, in particular from about 200 kg/m³ to about 500 kg/m³, in particular from about 200 kg/m³ to about 400 kg/m³, in particular from about 200 kg/m³ to about 375 kg/m³.

According to a particular aspect of the present disclosure, the closure comprises a plurality of cells. Such a plurality of cells can be achieved, for example, in a foamed material, also referred to as a foam or as a foamed plastic. The closure according to the present disclosure particularly comprises at least one foamed material.

The plurality of cells of the disclosed closure is further advantageously defined as being a plurality of substantially closed cells, or that the foam is a substantially closed cell foam. Closed cell foams are generally defined as comprising cells, also referred to as pores, which are substantially not interconnected with each other. Closed cell foams have higher dimensional stability, lower moisture absorption coefficients, and higher strength compared to open-cell-structured foams.

It is therefore a particular aspect of the closure disclosed herein that the plurality of cells is a plurality of substantially closed cells.

According to a particular aspect of the closure disclosed herein, the plurality of cells comprises a cell size in a range of from about 0.025 mm to about 0.5 mm, in particular from about 0.05 mm to about 0.35 mm. The cell size is measured according to standard test methods known to the skilled person.

In order to control the cell size in the closure, and attain the desired cell size detailed above, a nucleating agent can be employed. In a particular embodiment, it has been found that by employing a nucleating agent selected from the group consisting of calcium silicate, talc, clay, titanium oxide, silica, barium sulfate, diatomaceous earth, and mixtures of citric acid and sodium bicarbonate, the desired cell density and cell size is achieved.

As is well known in the industry, a blowing agent can be employed in forming plastic material, for example extruded foam plastic material, such as is advantageous for the closure. In the present disclosure, a variety of blowing agents can be employed during the manufacturing process whereby the closure is produced. Typically, either physical blowing agents or chemical blowing agents are employed. Suitable blowing agents that have been found to be efficacious in producing the closure of the present disclosure comprise one or more selected from the group consisting of: aliphatic hydrocarbons having 1-9 carbon atoms, halogenated aliphatic hydrocarbons having 1-9 carbon atoms and aliphatic alcohols having 1-3 carbon atoms. Aliphatic hydrocarbons include methane, ethane, propane, n-butane, isobutane, n-pentane, isopentane, neopentane, and the like. Among halogenated hydrocarbons and fluorinated hydrocarbons they include, for example, methylfluoride, perfluoromethane, ethyl fluoride, 1,1-difluoroethane (HFC-152a), 1,1,1-trifluoroethane (HFC-430a), 1,1,1,2-tetrafluoroethane (HFC-134a), pentafluoroethane, perfluoroethane, 2,2-difluoropropane, 1,1,1-trifluoropropane, perfluoropropane, perfluorobutane, perfluorocyclobutane. Partially hydrogenated chlorocarbon and chlorofluorocarbons for use in this disclosure include methyl chloride, methylene chloride, ethyl chloride, 1,1,1-trichlorethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC11), dichlorodifluoromethane (CFC-12), trichlorotrifluoroethane (CFC-113), dichlorotetrafluoroethane (CFC-114), chloroheptafluoropropane, and dichlorohexafluoropropane. Fully halogenated chlorofluorocarbons are not preferred due to their ozone depletion potential. Aliphatic alcohols include methanol, ethanol, n-propanol and isopropanol. Chemical blowing agents include azodicarbonamic, azodicarbonamide, azodiisobutyro-nitride, benzenesulfonhydrazide, 4,4-oxybenzene sulfonylsemicarbazide, p-toluene sulfonylsemicarbazide, barium azodicarboxlyate, N,N'-Dimethyl-N,N'-dinitrosoterephthalamide, and trihydrazinotriazine. An example of a suitable chemical blowing agent is sold by Clariant International Ltd, BU Masterbatches (Rothausstr. 61, 4132 Muttenz, Switzerland) under the trade name Hydrocerol®.

In a particular aspect, inorganic, or physical, blowing agents are used in making the closure according to the present disclosure. Examples of inorganic blowing agents include carbon dioxide, water, air, helium, nitrogen, argon, and mixtures thereof. Carbon dioxide and nitrogen are particularly useful blowing agents.

Expandable microspheres can also be considered as blowing agent according to the present disclosure.

According to another exemplary embodiment of the present disclosure, in order to produce the desired product, the blowing agent may be incorporated into the plastic material in a quantity ranging from about 0.005% to about 10% by weight of the weight of the plastic material. The term "plastic material" refers to the material from which the closure is formed, which may also comprise a natural organic filler as described herein.

According to an exemplary aspect of the present disclosure, said closure comprises one or more thermoplastic polymers. In a particular aspect of the present disclosure, said at least one thermoplastic polymer is selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluorelastomers, fluoropolymers, polyethylenes, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers, cyclic olefin copolymers, styrene ethylene butadiene styrene block copolymers, styrene ethylene butylene styrene block copolymers, styrene ethylene butylene block copolymers, styrene butadiene styrene block copolymers, styrene butadiene block copolymers, styrene isoprene styrene block copolymers, styrene isobutylene block copolymers, styrene isoprene block copolymers, styrene ethylene propylene styrene block copolymers, styrene ethylene propylene block copolymers, polyvinylalcohol, polyvinylbutyral, polyhydroxyalkanoates, copolymers of hydroxyalkanoates and monomers of biodegradable polymers, poly(lactic acid), copolymers of lactic acid and monomers of biodegradable polymers, aliphatic copolyesters, aromatic-aliphatic copolyesters, and mixtures thereof.

According to the present disclosure, the cyclic olefin based copolymer can comprise:
(A1) 20 mol % to 80 mol %, particularly 25 mol % to 75 mol %, particularly 30 mol % to 70 mol %, particularly 35 mol % to 65 mol %, particularly 40 mol % to 60 mol %, of repeating units derived from at least one polymerisable ethylenically unsaturated monomer unit;
(A2) 80 mol % to 20 mol %, particularly 75 mol % to 25 mol %, particularly 70 mol % to 30 mol %, particularly 65 mol % to 35 mol %, particularly 60 mol % to 40 mol %, of repeating units derived from at least one cyclic ethylenically unsaturated monomer unit which is copolymerisable with the at least one linear ethylenically unsaturated monomer unit (A1); and
(A3) 0 mol % to 10 mol %, particularly 0 mol % to 7 mol %, particularly 0 mol % to 5 mol %, particularly 0 mol % to 3 mol %, of repeating units derived from at least one further ethylenically unsaturated monomer unit and which are copolymerisable with at least one, preferably both, of (A1) and (A2).

The at least one polymerisable ethylenically unsaturated monomer unit (A1) according to the present disclosure may be a branched or linear ethylenically unsaturated monomer unit, in particular a branched or linear $C_2$-$C_8$ ethylenically unsaturated monomer unit, particularly a branched or linear $C_2$-$C_7$ ethylenically unsaturated monomer unit, particularly a branched or linear $C_2$-$C_6$ ethylenically unsaturated monomer unit, particularly a branched or linear $C_2$-$C_5$ ethylenically unsaturated monomer unit, particularly a branched or linear $C_2$-$C_4$ ethylenically unsaturated monomer unit, particularly a branched or linear $C_2$-$C_3$ ethylenically unsaturated monomer unit, particularly a branched or linear $C_2$, $C_3$, $C_4$, $C_5$, $C_6$, $C_7$ or $C_8$ ethylenically unsaturated monomer unit, particularly a branched or linear $C_2$ or $C_3$ ethylenically unsaturated monomer unit, which may be substituted with from 1 to 4 substituents, particularly 1, 2, 3 or 4 substituents, selected from linear $C_1$-$C_8$ alkyl groups, particularly linear $C_1$, $C_2$, $C_3$, $C_4$, $C_5$, $C_6$, $C_7$ or $C_8$ alkyl groups, branched $C_1$-$C_8$ alkyl groups, particularly branched $C_1$, $C_2$, $C_3$, $C_4$, $C_5$, $C_6$, $C_7$ or $C_8$ alkyl groups, $C_6$-$C_{18}$ aryl groups, particularly $C_6$, $C_7$, $C_8$, $C_9$, $C_{10}$, $C_{11}$, $C_{12}$, $C_{13}$, $C_{14}$, $C_{15}$, $C_{16}$, $C_{17}$ or $C_{18}$ aryl groups. Linear ethylenically unsaturated monomer units (A1), in particular $C_2$-$C_8$ α-olefin are particularly advantageous according to the present disclosure. According to a particular aspect of the cyclic olefin copolymer of the present disclosure, the at least one polymerisable, linear ethylenically unsaturated monomer unit (A1) is an α-olefin, particularly a $C_2$-$C_8$ α-olefin, particularly a linear $C_2$-$C_8$ α-olefin, particularly a linear $C_2$, $C_3$, $C_4$, $C_5$, $C_6$, $C_7$ or $C_8$ α-olefin, which is optionally substituted with from 1 to 4 substituents selected from linear $C_1$-$C_8$ alkyl groups, branched $C_1$-$C_8$ alkyl groups, $C_6$-$C_{18}$ aryl groups. Ethylenically unsaturated monomer units (A1) are particularly selected from ethylene, prop-1-ene, but-1-ene, pent-1-ene, hex-1-ene, hept-1-ene, oct-1-ene, which may be substituted with from 1 to 4 substituents selected from linear $C_1$-$C_8$ alkyl groups, branched $C_1$-$C_8$ alkyl groups, $C_6$-$C_{18}$ aryl groups. Ethylenically unsaturated monomer units (A1) are more particularly selected from ethylene, prop-1-ene and but-1-ene, yet more particularly selected from ethene and prop-1-ene. According to a particular aspect of the present disclosure the ethylenically unsaturated monomer units (A1) are ethylene.

According to a further aspect of the present disclosure, the at least one cyclic ethylenically unsaturated monomer unit (A2) is selected from the group consisting of norbornene, alkyl substituted norbornene, vinyl norbornene, norbornadiene, tetracyclododecene, which may be substituted with one, two, three, four five or six substituents selected from the group consisting of linear $C_1$-$C_8$ alkyl groups, branched $C_1$-$C_8$ alkyl groups, $C_6$-$C_{18}$ aryl groups, $C_7$-$C_{20}$ alkylene aryl groups, $C_2$-$C_{20}$ cyclic alkenyl groups, $C_2$-$C_{20}$ non-cyclic alkenyl groups, halogen, hydroxyl, ester group, alkoxy group, carboxy group, cyano group amido group, imido group, silyl group.

According to a further aspect of the cyclic olefin copolymer of the present disclosure, the proportion of repeating units (A2) being present in the form of dimer is not more than 50 mol % and the proportion of repeating units (A2) being present in the form of trimer is not less than 5 mol %. The term "dimer" in this context refers to a unit in which two individual repeating units (A2) are bound to each other through reaction of their ethylenically unsaturated bonds, this unit then being incorporated intact into the copolymer chain. The term "trimer" in this context refers to a unit in which three individual repeating units (A2) are bound to each other through reaction of their ethylenically unsaturated bonds, this unit then being incorporated intact into the copolymer chain.

According to a particular aspect of the present disclosure, the cyclic olefin copolymer is a copolymer of ethylene and norbornene.

Suitable cyclic olefin copolymers, as well as methods for their synthesis and characterization, are described in U.S. Pat. No. 8,063,163 B2, the contents of which in relation thereto are incorporated by reference herein and form a part of the present disclosure. A particularly suitable cyclic olefin copolymer is commercially available under the name Topas® Elastomer E-140 from Topas Advanced Polymers, Germany.

According to an aspect of the present disclosure, the polyhydroxyalkanoate monomers contain at least four carbon atoms. Advantageously, the repeat unit of the polyhydroxyalkanoate according to the present disclosure comprises [—O—CHR—CH$_2$—CO—], wherein R is a linear or branched alkyl group with the formula $C_nH_{2n+1}$ with n being an integer from 1 to 15, particularly from 1 to 6.

According to another aspect of the disclosure, the closure contains an aliphatic-aromatic copolyester. In particular, the aliphatic-aromatic copolyester has a glass transition temperature of less than 0° C., preferably less than −4° C., more preferably less than −10° C., more preferably less than −20° C., more preferably less than −30° C. According to yet another particular embodiment of the closure according to the disclosure, the aliphatic-aromatic copolyester is a statistical copolyester on the basis of at least adipic acid and/or sebacic acid. In a statistical copolyester, the constituting monomers are irregularly distributed along the polymer chain. Statistical copolyesters are sometimes also referred to as random copolyesters. Preferably, the aliphatic-aromatic copolyester according to the disclosure is a copolyester or a statistical copolyester on the basis of 1,4-butanediol, adipic acid or sebacic acid, and terephthalic acid or an ester-forming derivative of terephthalic acid. Preferably, the aliphatic-aromatic copolyester according to the disclosure exhibits a glass transition temperature of from −25° C. to −40° C., more preferably from −30° C. to −35° C., and/or an area of melting temperatures of from 100° C. to 120° C., more preferably from 105° C. to 115° C.

Particularly good results according to the present disclosure are obtained when the at least one thermoplastic polymer is biodegradable. Preferably, said at least one thermoplastic polymer is selected from the group consisting of polyvinylalcohol, polyhydroxyalkanoates, copolymers of hydroxyalkanoates and monomers of biodegradable polymers, polyvinylbutyral, poly(lactic acid), copolymers of lactic acid and monomers of biodegradable polymers, polycaprolactone, polyglycolide, poly(3-hydroxybutyrate), poly(3-hydroxybutyrate-co-3-hydroxyvalerate), poly(3-hydroxybutyrate-co-3-hydroxyhexanoate), poly(butylensuccinate), poly(butylensuccinate-co-adipate), poly(trimethyleneterephthalate), poly(butylenadipate-co-terephthalate), poly(butylensuccinate-co-terephthalate), poly(butylensebacate-co-terephthalate), lactic acid caprolactone lactic acid copolymers, lactic acid ethylene oxide lactic acid copolymers, and mixtures thereof. These polymers are particularly useful for providing a biodegradable closure. Suitable biodegradable polymers are known to the skilled person. A very good overview of suitable biodegradable polymers can be found in "Bio-Based Plastics: Materials and Applications", Stephan Kabasci, editor, John Wiley & Sons, 2014, ISBN 978-1119994008. An example of a suitable biodegradable thermoplastic polymer is sold by BASF Corporation of Wyandotte, Mich. (US) under the trade name Ecoflex®.

According to a particular aspect of the present disclosure, said at least one thermoplastic polymer comprised in the closure is biodegradable according to ASTM D6400.

In a specific embodiment of the present disclosure, the closure is produced by injection molding.

In another embodiment of the present disclosure, the closure is produced by extrusion.

In a further embodiment of the present disclosure, the closure is produced by co-extrusion.

In another embodiment of the present disclosure, the closure is produced by mono-extrusion.

In a further specific embodiment of the disclosure, the closure further comprises a) a core member comprising at least one thermoplastic polymer, and
b) at least one peripheral layer at least partially surrounding and intimately bonded to at least one surface of the core member, said peripheral layer comprising at least one thermoplastic polymer, wherein at least one of the core member and the peripheral layer comprises a plurality of cells.

According to one aspect of the closure according to the present disclosure, the closure comprises a core member and does not comprise a peripheral layer. In this aspect, the natural organic filler is comprised in the core member. This aspect can be advantageous particularly in reducing cost per closure, and simplifying the production.

According to another aspect of the present disclosure, the closure comprises at least one peripheral layer at least partially surrounding and intimately bonded to at least one surface of the core member. The at least one peripheral layer is generally desirable in attaining a bottle closure which is suitable as a closure or stopper for the wine industry. The closure may comprise more than one peripheral layer, for example two, three or four peripheral layers.

Due to the operation of the cooperating jaws which are employed to compress the stopper for insertion into the bottle, sharp edges of the jaw members are forced into intimate contact with the outer surface of the stopper. Prior art closures have been known to be incapable of resisting these cutting forces. As a result, longitudinal cuts, score lines or slits can be formed in the outer surface of the stopper, enabling liquid to seep from the interior to the exterior of the bottle. This disadvantage, existing with prior art cork and closures from alternative materials such as polymers, can be reduced or even eliminated by incorporating at least one peripheral layer according to the present disclosure. In addition, by forming at least one peripheral layer as disclosed herein, the present disclosure provides a bottle closure which contributes to reducing or even overcoming the prior art disadvantages.

In an embodiment of the present disclosure the closure comprises at least one peripheral layer, particularly an outermost peripheral layer, with a tough, score and mar resistant surface. In this respect, it is advantageous according to this aspect of the present disclosure that said at least one peripheral layer comprises a density in the ranges disclosed herein.

According to a particular aspect of the present disclosure, the natural organic filler is comprised in at least one of the core member and the peripheral layer.

In a particular aspect of the present disclosure the natural organic filler is comprised in the core member and in the peripheral layer.

In a further aspect of the present disclosure the natural organic filler is comprised in the core member, and is substantially absent from the peripheral layer, if present.

In a particular aspect of the present disclosure the closure comprises a peripheral layer and the natural organic filler is comprised in the peripheral layer. According to this aspect the natural organic filler can be substantially absent from the core member.

In particular aspects of the closure disclosed herein, the natural organic filler is comprised in an amount in the range of from 0.5 wt. % to 75 wt. %, in particular 1 wt. % to 70 wt. %, more particularly in an amount in the range of from 1 wt. %, 2 wt. %, 3 wt. %, 4 wt. %, 5 wt. %, 6 wt. %, 7 wt. %, 8 wt. %, 9 wt. %, or 10 wt. %, to 70 wt. %, more particularly in an amount in the range of from 11 wt. %, 12 wt. %, 13 wt. %, 14 wt. %, 15 wt. %, 16 wt. %, 17 wt. %, 18 wt. %, 19 wt. % or 20 wt. % to 65 wt. %, more particularly in an amount in the range of from 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 33 wt. %, 34 wt. %, 35 wt. %, 36 wt. %, 37 wt. %, 38 wt. %, 39 wt. %, 40 wt. %, 41 wt. %, 42 wt. %, 43 wt. %, 44 wt. %, 45 wt. %, 46 wt. %, 47 wt. %, 48 wt. %, 49 wt. %, 50 wt. %, 51 wt. %, 52 wt. %, 53 wt. %, 54 wt. % or 55 wt. % to 60 wt. %, in each case based on the total weight of the closure. If the natural organic filler is comprised in the core member, or in the core member and in the peripheral layer, the natural organic filler is particularly comprised in the above ranges in an amount of at least 51 wt. %, particularly in an amount in the range of from 51 wt. % to 75 wt. %, more particularly in an amount in the range of from 51 wt. % to 70 wt. %, even more particularly in an amount in the range of from 51 wt. % to 65 wt. %, yet more particularly in an amount in the range of from 51 wt. % to 60 wt. %, in each case based on the total weight of the closure.

According to an aspect of the disclosure wherein the natural organic filler is comprised in the peripheral layer, the natural organic filler is comprised in an amount in the range of from 5 wt. % to 75 wt. %, based on the total weight of the peripheral layer, or in an amount in the range of from 0.5 wt. % to 15 wt. %, based on the total weight of the closure. If the natural organic filler is comprised in the peripheral layer and not comprised in the core member the natural organic filler can be comprised in an amount in the range of from 5 wt. %, 6 wt. %, 7 wt. %, 8 wt. %, 9 wt. %, or 10 wt. %, to 75 wt. %, more particularly in an amount in the range of from 11 wt. %, 12 wt. %, 13 wt. %, 14 wt. %, 15 wt. %, 16 wt. %, 17 wt. %, 18 wt. %, 19 wt. % or 20 wt. % to 70 wt. %, more particularly in an amount in the range of from 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 33 wt. %, 34 wt. %, 35 wt. %, 36 wt. %, 37 wt. %, 38 wt. %, 39 wt. %, 40 wt. %, 41 wt. %, 42 wt. %, 43 wt. %, 44 wt. %, 45 wt. %, 46 wt. %, 47 wt. %, 48 wt. %, 49 wt. %, 50 wt. %, 51 wt. %, 52 wt. %, 53 wt. %, 54 wt. % or 55 wt. % to 65 wt. %, in each case based on the total weight of the peripheral layer, or in an amount in the range of from 0.5 wt. %, 1 wt. %, 2 wt. %, 3 wt. %, 4 wt. %, 5 wt. %, 6 wt. %, 7 wt. %, 8 wt. %, 9 wt. % or 10 wt. % to 15 wt. %, based on the total weight of the closure, more particularly in an amount in the range of from 0.5 wt. %, 1 wt. %, 2 wt. %, 3 wt. %, 4 wt. %, 5 wt. %, 6 wt. % or 7 wt. % to 12 wt. %, based on the total weight of the closure, more particularly in an amount in the range of from 0.5 wt. %, 1 wt. %, 2 wt. %, 3 wt. %, 4 wt. %, 5 wt. %, 6 wt. % or 7 wt. % to 10 wt. %, based on the total weight of the closure.

The natural organic filler according to the present disclosure particularly comprises particles having a particle size measured by the laser diffraction method according to ISO 13320 in the range of from 0.1 µm to 2000 µm, particularly in the range of from 1 µm to 1500 µm, more particularly in the range of from 1 µm to 1200 µm, even more particularly in the range of from 1 µm to 1000 µm, yet more particularly in the range of from 1 µm to 900 µm, even more particularly in the range of from 1 µm to 800 µm, even more particularly in the range of from 1 µm to 700 µm, even more particularly in the range of from 1 µm to 600 µm, and more particularly in the range of from 1 µm to 500 µm. In a specific embodiment according to this disclosure, the natural organic filler consists of particles having a particle size as specified above. Particle size distributions can be measured using the sedigraph method.

According to a particular embodiment of the present disclosure, the at least one peripheral layer comprises natural organic filler particles with a particle size smaller than 500 µm.

According to another embodiment of the present disclosure, the core member comprises natural organic filler particles with a particle size in the range of from 100 µm to 2000 µm.

In a specific embodiment of the present disclosure the natural organic filler is free from oils and/or sensory constituents. Examples for sensory constituents are phenolic compounds, for example polyphenols, flavonoids, for example proanthocyanidins, and tannins. A treatment step to obtain a natural organic filler free from oils and/or sensory constituents can be, for example, by means of pressing, grinding, washing, heating, steam heating, infrared heating, or microwave heating. Suitable treatments to remove oils and/or sensory constituents are known in principle to the skilled person. A treatment by washing can be effected, for example, by means of any suitable solvent, including, but not limited to, organic solvents such as alcohols or hydrocarbons, aqueous fluids such as washing solutions or dispersions which are capable of removing oils and/or sensory constituents from natural organic fillers, or supercritical fluids such as supercritical carbon dioxide. Environmentally friendly solvents which are also food-safe are preferred, such as aqueous fluids or supercritical fluids. During a washing step the natural organic filler can be suspended in the solvent, optionally agitated, and then the solvent removed by filtration or the like. A treatment step, in particular a washing step, can be repeated as many times as necessary to achieve an acceptable level of oils and/or sensory constituents, particularly of phenolic compounds. The amount of sensory constituents released into wine can be measured as so-called "releasable sensory constituents" by soaking a sample of the natural organic filler in a wine for 24 hours for an untreated natural organic filler or 48 hours for a treated natural organic filler, and measuring the amount of each sensory constituent in the wine, for example by means of chromatographic or spectroscopic methods such as gas chromatography or nuclear magnetic resonance spectroscopy. An acceptable level is generally considered to be one which results in an amount of the respective sensory constituent, particularly of the respective phenolic compound in the wine, which is below the average sensory threshold of the respective sensory constituent.

In a particular aspect of the closure according to the present disclosure the natural organic filler has at least one, particularly both of the properties:

a bulk density in the range of from 100 kg/m$^3$ to 1500 kg/m$^3$, particularly 100 kg/m$^3$ to 1300 kg/m$^3$, particularly in the range of from 150 kg/m$^3$ to 1000 kg/m$^3$, particularly in the range of from 170 kg/m$^3$ to 900 kg/m$^3$, particularly in the range of from 200 kg/m$^3$ to 800 kg/m$^3$, particularly in the range of from 250 kg/m$^3$ to 700 kg/m$^3$;

a humidity in the range of from about 0% to about 15%, particularly in the range of from 0 to about 10%, particularly in the range of from about 0% to about 9%, particularly in the range of from about 0% to about 8%, particularly in the range of from about 0% to about 7%, particularly in the range of from about 0% to about 6%, more particularly in the range of from about 0% to about 5%, more particularly in the range of from about 0% to about 4%, more particularly in the range of from about 0% to about 3%, more particularly in the range of from about 0% to about 2%, more particularly in the range of from about 0% to about 1%. A lower limit may be, for example, 0%, 0.1%, 0.2%, 0.4%, 0.5%, 0.6% or 0.7%.

In a further specific embodiment of the present disclosure, the natural organic filler is a mixture of natural organic filler and polymer. Any mixing process suitable for mixing materials that are solid at room temperature involving the application of mechanical and/or thermal energy is, in principle possible. Suitable methods are known to the skilled person. The mixing process may comprise a heating step to temperatures from 40° C. to 200° C. Suitable polymers for this process are selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluoroelastomers, fluoropolymers, polyethylenes, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers, cyclic olefin copolymers, polyvinylalcohol, polyvinylbutyral, polyhydroxyalkanoates, copolymers of hydroxyalkanoates and monomers of biodegradable polymers, aliphatic copolyesters, aromatic-aliphatic copolyesters, poly(lactic acid), copolymers of lactic acid and monomers of biodegradable polymers, polycaprolactone, polyglycolide, poly(3-hydroxybutyrate), poly(3-hydroxybutyrate-co-3-hydroxyvalerate), poly(3-hydroxybutyrate-co-3-hydroxyhexanoate), poly(butylensuccinate), poly(butylensuccinate-co-adipate), poly(trimethyleneterephthalate), poly(butylenadipate-co-terephthalate), poly(butylensuccinate-co-terephthalate), poly(butylensebacate-co-terephthalate), lactic acid caprolactone lactic acid copolymers, lactic acid ethylene oxide lactic acid copolymers, and mixtures thereof. An example of a suitable polymer for this process is sold by BASF Corporation of Wyandotte, Mich. (US) under the trade name Ecoflex®. This modification step aids in compatibilizing the natural organic filler with the polymers employed for the closure.

In a further specific embodiment, the natural organic filler is at least partially coated with a polymer. Suitable polymers for the coating include the polymers described hereinabove.

These properties of the natural organic filler also apply to the natural organic filler used in the methods according to the present disclosure as described hereinbelow.

Although in principle, any natural organic filler (preferably except for a filler derived from cork) could be employed according to the present disclosure, closures containing certain natural organic fillers have been found to yield a closure with advantageous properties. Therefore, in certain embodiments disclosed herein, the closure contains at least one natural organic filler, wherein the at least one natural organic filler is selected from the group consisting of grape seed flour, grape skin powder, grape pomace powder, grape pomace flour, rice hull flour, oat hull flour, peanut hull flour, soybean hull flour, starch flour, corn starch flour, cellulose flour, wood flour, rice straw flour, corn cob flour, cricket flour, bagasse flour, kenaf flour, microcrystalline cellulose, nanocellulose, hemp flour.

According to another embodiment, said natural organic filler is grape seed flour.

Grape seed flour according to this disclosure must contain the flour from grape seeds, but may optionally also contain the flour obtained from other by-products of wine-making such as the grape skins or grape stems.

According to a further embodiment, said grape seed flour is substantially free from oils and/or sensory constituents. Closures with grape seed flour that is free from oils and/or sensory constituents have been found to have advantageous sensory properties. Suitable treatments to obtain grape seed flour free from oils and/or sensory constituents are the same as described for the natural organic filler above.

As described hereinabove, the closure of the present disclosure can particularly comprise at least one peripheral layer intimately bonded to substantially the entire substantially cylindrical surface of the core member. If any large unbonded areas exist, flow paths for gas and liquid could result. Consequently, secure, intimate, bonded interengagement of the at least one peripheral layer, if present, with the core member is advantageous for attaining a bottle closure for the wine industry.

In one embodiment of the present disclosure, the closure is produced by a process comprising at least a process step of extrusion. For closures comprising a core member and at least one peripheral layer, this allows to achieve integral bonded interconnection between the at least one peripheral layer and the core member, since the at least one peripheral layer is formed about the core member in a manner which assures intimate bonded engagement.

Particularly, for closures comprising a core member and at least one peripheral layer, the desired secure, intimate, bonded, interengagement can be attained by simultaneous co-extrusion of the at least one peripheral layer and the core member or by applying the at least one peripheral layer to the continuous, elongated length of material after the continuous, elongated length of material has been formed. By employing either process, intimate bonded interengagement of the at least one peripheral layer to the continuous, elongated length of material is attained.

In a particular aspect of the present disclosure, therefore, the closure is produced by a process comprising at least a process step of co-extrusion. According to this aspect of the disclosure, the closure comprises a core member and a peripheral layer, which are formed by co-extrusion. Suitable co-extrusion methods are known to the skilled person. Co-extrusion allows an advantageous bonding of the peripheral layer to the core member.

In one aspect of the present disclosure, said core member and said at least one peripheral layer are extruded substantially simultaneously.

In another aspect of the present disclosure, said core member is extruded separately and subsequent thereto said at least one peripheral layer is formed in extrusion equipment peripherally surrounding and enveloping the preformed core member.

In further aspects of the disclosed closure, comprising two or more peripheral layers, it is possible that a first peripheral layer which is in secure, intimate, bonded, interengagement with the outer cylindrical surface of the core member is formed by either substantially simultaneous extrusion with the core member, or by subsequent extrusion, as described herein. A second layer and subsequent peripheral layers can then be formed likewise by either substantially simultaneous extrusion with the core member and the first or further peripheral layers, or by subsequent extrusion, as described herein for the first peripheral layer. With multiple peripheral layers it is also possible that two or more peripheral layers are extruded subsequently, as described herein, but substantially simultaneously with each other.

According to a particular aspect of the closure according to the present disclosure, the closure is produced by a process comprising at least a process step of maintaining an extrusion temperature in the range of from about 100° C. to about 200° C., or in the range of from about 120° C. to about 170° C., or in the range of from about 125° C. to about 170° C., or in the range of from about 130° C. to about 165° C., or in the range of from about 135° C. to about 165° C., or in the range of from about 140° C. to about 160° C. An extrusion temperature in the disclosed range is particularly maintained during extrusion of a material comprising a natural organic filler. If the temperature exceeds this range there is a risk of discoloration and/or degradation of the natural organic filler, as well as burnt aromas which could affect a food product coming into contact with the closure.

In a particular aspect of the disclosed closure comprising a core member, the core member comprises a plurality of cells. Such a plurality of cells can be achieved, for example in a foamed material. In a further particular aspect of the present disclosure, the core comprises a foamed material. The peripheral layer can also comprise a plurality of cells, for example in the form of an at least partially foamed material. However, the at least one peripheral layer, if present, is formed with a substantially greater density than the core material, in order to impart desired physical characteristics to the bottle closure of the present disclosure. According to an exemplary aspect of the present disclosure, the core member is foamed and the at least one peripheral layer is substantially not foamed, particularly not foamed. It is also conceivable for the peripheral layer to be foamed, for example by means of a small amount of foaming agent or expandable microspheres in the peripheral layer, for example to make it more flexible. However, the peripheral layer advantageously still has a higher density than the core member. It is advantageous that the cell size and/or cell distribution in the foam, particularly in the core member, are substantially uniform throughout the entire length and/or diameter of the foamed material, particularly are substantially uniform throughout the entire length and/or diameter of the core member. In this way closures with substantially uniform properties, such as, for example OTR, compressibility and compression recovery, can be provided. According to a particular aspect of the closure disclosed herein, therefore, at least one of the size and the distribution of the plurality of cells in the core member is substantially uniform throughout at least one of the length and the diameter of the core member.

In particular, for a disclosed closure comprising a core member, the core member is exemplarily defined as comprising substantially closed cells. Closed cell foams are generally defined as comprising cells, also referred to as pores, which are substantially not interconnected with each other. Closed cell foams have higher dimensional stability, lower moisture absorption coefficients, and higher strength compared to open-cell-structured foams.

In order to assure that the core member of the disclosed closure comprising a core member possesses inherent consistency, stability, functionality and capability of providing long-term performance, the cell size of the core material is advantageously substantially homogeneous throughout its entire length and diameter.

In another exemplary aspect of the disclosed closure comprising a core member, the core member comprises closed cells having at least one of closed cells having an average cell size ranging from about 0.02 millimeters to about 0.50 millimeters and a cell density ranging from about 8,000 cells/cm$^3$ to about 25,000,000 cells/cm$^3$. Although this cell configuration has been found to produce a highly effective product, it has been found that even more advantageous products are those wherein said core member comprises at least one of an average cell size ranging from about 0.05 mm to about 0.1 mm and a cell density ranging from about 1,000,000 cells/cm$^3$ to about 8,000,000 cells/cm$^3$.

In order to control the cell size in the core member of the closure, and attain the desired cell size detailed above, a nucleating agent can be employed. The details of the nucleating agent are the same as described hereinabove for the closure according to the disclosure.

As is well known in the industry, a blowing agent can be employed in forming plastic material, for example extruded foam plastic material, such as is advantageous for the core member of the closure of the present disclosure comprising a core member. The details of the blowing agent are the same as described hereinabove for the closure according to the disclosure.

In one embodiment, the closure according to the present disclosure and comprising a core and at least one peripheral layer particularly has a substantially cylindrical shape comprising substantially flat terminating surfaces forming the opposed ends of said closure and the substantially flat terminating surfaces of the core member are substantially devoid of the peripheral layer. The closure has a substantially cylindrical form comprising a substantially cylindrical peripheral surface and two substantially flat terminating faces at the opposing ends of the cylindrical form. In this embodiment, in addition to a core member which possesses a construction with physical characteristics similar to natural cork, and has a substantially cylindrical form with a substantially cylindrical peripheral surface, the closure of the present disclosure comprises at least one peripheral layer at least partially surrounding and intimately bonded to at least one surface, particularly the substantially cylindrical surface, of the core member. The ends of the closure can be beveled or chamfered, as is known from the prior art. Although any desired bevel or chamfered configuration can be employed, such as a radius, curve, or flat surface, it has been found that merely cutting the terminating ends at the intersection with the longitudinal cylindrical surface of the elongated length of material, with or without at least one peripheral layer as described herein, at an angle in the range of from about 30° to about 75°, for example in the range of from about 35° to about 70°, particularly in the range of from about 40° to about 65°, allows formation of a closure which is easier to insert into the neck of a container. Details of the bevel and/or chamfer configuration as described hereinabove also apply to this embodiment.

According to a particular aspect of the disclosed closure comprising a core member, the thermoplastic polymer comprised in the core member is a low density polymer having an unfoamed density in the range of from 0.7 g/cm$^3$ to 1.5 g/cm$^3$. This aspect is particularly advantageous if the core member comprises larger amounts of natural organic filler within the ranges disclosed herein, for example more than 25 wt. %, more than 30 wt. %, more than 35 wt. %, more than 40 wt. %, more than 45 wt. %, more than 50 wt. % and particularly more than 51 wt. % natural organic filler. A lower polymer density helps to compensate the increase in density of the closure resulting from inclusion of the natural organic filler.

In an exemplary aspect according to the present disclosure the bottle closure of the present disclosure can comprise, as its principal component, a core member which is formed from extruded, foamed, thermoplastic polymers, copolymers, or homopolymers, or blends thereof. Although any known thermoplastic polymeric material, particularly any foamable thermoplastic polymeric material can be employed in the bottle closure of the present disclosure, the thermoplastic plastic material must be selected for producing physical properties similar to natural cork, so as to be capable of providing a closure for replacing natural cork as a closure for wine bottles. By way of example, the thermoplastic plastic material for the core member can be a closed cell plastic material.

According to an exemplary aspect, the closure according to the disclosure comprising a core member and at least one peripheral layer comprises one or more thermoplastic polymers. According to this aspect, particularly at least one, particularly both of the core material and the material of the at least one peripheral layer comprise one or more thermoplastic polymers. In an exemplary aspect, the at least one peripheral layer comprises a thermoplastic polymer identical or similar to the thermoplastic polymer comprised in the core member. A peripheral layer can, on the other hand, comprise a thermoplastic polymer which is different from the thermoplastic polymer or thermoplastic polymers comprised in the core member. According to this embodiment, however, as detailed herein, the physical characteristics imparted to the peripheral layer particularly differ substantially from the physical characteristics of the core member; in particular the peripheral layer density is greater than the core member density.

In a particular aspect of the disclosed closure comprising a core member, the core member comprises at least one thermoplastic polymer selected from the group as mentioned in the group for the at least one thermoplastic polymer comprised in the closure above. If a polyethylene is employed, in an exemplary aspect of the closure disclosed herein the polyethylene comprises one or more polyethylenes selected from the group consisting of high density, medium density, low density, linear low density, ultra high density, and medium low density polyethylenes. Particularly useful plastic materials for the core element can be polyethylene, in particular LDPE, and/or ethylene-vinyl-acetate copolymer (EVA). These materials can be used alone or in combination with one or more other thermoplastic polymers disclosed herein, in particular with metallocene PE or metallocene PP, particularly with metallocene PE. If a PHA is employed, in an exemplary aspect of the present disclosure, the PHA comprises one or more PHAs selected from the group consisting of poly(3-hydroxybutyrate), poly(3-hydroxybutyrate-co-3-hydroxyvalerate), and poly(3-hydroxybutyrate-co-3-hydroxyhexanoate). Advantageously, these polymers have a molecular weight of from 100,000 g/mol to 1,000,000 g/mol and/or a melting point of from 100° C. to 200° C. Mixtures of one or more PHAs with poly(lactic acid) are also particularly useful. If a polyester is employed, in an exemplary aspect of the present disclosure, the polyester comprises one or more polyesters selected from the group consisting of polycaprolactone, polyglycolide, poly (butylensuccinate), poly(lactic acid), poly(butylensuccinate-co-adipate), poly(trimethyleneterephthalate), poly(butylenadipate-co-terephthalate), poly(butylensuccinate-co-terephthalate), poly(butylensebacate-co-terephthalate). A particularly suitable polyester is sold by BASF Corporation of Wyandotte, Mich. (US) under the trade name Ecoflex®. If a block copolymer of lactic acid is employed, in an exemplary aspect of the present disclosure, the block copolymer of lactic acid comprises lactic acid caprolactone lactic acid copolymers, lactic acid ethylene oxide lactic acid copolymers. Expandable microspheres of one or more of these thermoplastic polymers can also be considered according to the present disclosure. Expandable microspheres are microscopic spheres comprising a thermoplastic shell encapsulating a low boiling point liquid hydrocarbon. When heated to a temperature high enough to soften the thermoplastic shell, the increasing pressure of the hydrocarbon causes the microsphere to expand. The volume can increase by 60 to 80 times.

In another embodiment of the disclosed closure comprising a core member, the at least one thermoplastic polymer comprised in the core member is biodegradable according to ASTM D6400.

According to another aspect of the present disclosure, the closure may further comprise at least one of at least one fatty acid and at least one fatty acid derivative. If the closure comprises a core member, the at least one of at least one fatty acid and at least one fatty acid derivative is advantageously present in the core member. In order to achieve this, one or more fatty acid derivatives can be added to the at least one thermoplastic polymer which is used to prepare the core member. Exemplary fatty acid derivatives according to the present disclosure are fatty acid esters or fatty acid amides such as stearamides. The addition of at least one fatty acid derivative to the polymer composition of the closure imparts superior properties to the closure. In particular, it has been found that the oxygen transfer rate of the closure can be reduced substantially, thus further reducing unwanted oxidation of wine. In addition, it has been found that the use of a fatty acid derivative as additive does not have a negative impact on the performance characteristics of corks from alternative materials such as polymers, for example on extraction force, ovality control, diameter control and length control. In order to impart the desired OTR-reducing effect to the closure, the fatty acid derivative, if present, is used according to an exemplary aspect of the present disclosure in a concentration from about 0.01 wt. % to about 10 wt. %, in particular from about 0.1 wt. % to about 5 wt. %, more particularly from about 1 wt. % to about 3 wt. %, based on the total weight of thermoplastic polymer.

In a further exemplary embodiment of the disclosed closure comprising a core member, regardless of the thermoplastic polymer or thermoplastic polymers selected for forming the core member, said core member is further defined as comprising a density ranging from about 100 $kg/m^3$ to about 600 $kg/m^3$. Although this density range has been found to provide an effective core member, according to an exemplary aspect of the present disclosure the density ranges from about 100 $kg/m^3$ to about 500 $kg/m^3$, in particular from about 150 $kg/m^3$ to about 420 $kg/m^3$, more particularly from about 200 $kg/m^3$ to about 350 $kg/m^3$.

According to an exemplary aspect of the closure of the present disclosure comprising a core member and at least one peripheral layer, the peripheral layer comprises at least one thermoplastic polymer selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluorelastomers, fluoropolymers, polyethylenes, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers, cyclic olefin copolymers, styrene ethylene butadiene styrene block copolymers, styrene ethylene butylene styrene block copolymers, styrene ethylene butylene block copolymers, styrene butadiene styrene block copolymers, styrene butadiene block copolymers, styrene isoprene styrene block copolymers, styrene isobutylene block copolymers, styrene isoprene block copolymers, styrene ethylene propylene styrene block copolymers, styrene ethylene propylene block copolymers, polyvinylalcohol, polyvinylbutyral, polyhydroxyalkanoates, copolymers of hydroxyalkanoates and monomers of biodegradable polymers, aliphatic copolyesters, aromatic-aliphatic copolyesters, poly(lactic acid), copolymers of lactic acid and monomers of biodegradable polymers, polycaprolactone, polyglycolide, poly(3-hydroxybutyrate), poly(3-hydroxybutyrate-co-3-hydroxyvalerate), poly(3-hydroxybutyrate-co-3-hydroxyhexanoate), poly(butylensuccinate), poly(butylensuccinate-co-adipate), poly(trimethyleneterephthalate), poly(butylenadipate-co-terephthalate), poly(butylensuccinate-co-terephthalate), poly(butylensebacate-co-terephthalate), lactic acid caprolactone lactic acid copolymers, lactic acid ethylene oxide lactic acid copolymers, and combinations of two or more thereof. According to an exemplary aspect of the present disclosure said at least one peripheral layer is further defined as comprising one selected from the group consisting of foamed plastics and non-foamed plastics, advantageously having a substantially greater density than the core member, in order to impart desired physical characteristics to the bottle closure of the present disclosure. In particular, the composition employed for the at least one peripheral layer is particularly selected to withstand the compression forces imposed thereon by the jaws of the corking machine. However, many different polymers, as detailed herein, are able to withstand these forces and, as a result, can be employed for the at least one peripheral layer.

In exemplary aspects of the disclosed closure comprising a core member and at least one peripheral layer, the at least one peripheral layer comprises one or more materials selected from foamable thermoplastic polyurethanes, non-foamable thermoplastic polyurethanes, thermoplastic polyolefins, thermoplastic vulcanizates, EPDM rubber, polyolefins, particularly flexible polyolefins, particularly polyethylenes and polypropylenes, particularly metallocene polyethylenes and polypropylenes, fluoroelastomers, fluoropolymers, fluorinated polyolefins, particularly partially fluorinated or perfluorinated polyethylenes, particularly polytetrafluoroethylenes, olefin block copolymers, cyclic olefin copolymers, styrene block copolymers, for example styrene butadiene block copolymers, thermoplastic elastomers, polyether-type polyurethanes, polyvinylalcohol, polyvinylbutyral, polyhydroxyalkanoates, copolymers of hydroxyalkanoates and monomers of biodegradable polymers, aliphatic copolyesters, aromatic-aliphatic copolyesters, poly(lactic acid), copolymers of lactic acid and monomers of biodegradable polymers, polycaprolactone, polyglycolide, poly(3-hydroxybutyrate), poly(3-hydroxybutyrate-co-3-hydroxyvalerate), poly(3-hydroxybutyrate-co-3-hydroxyhexanoate), poly(butylensuccinate), poly(butylensuccinate-co-adipate), poly(trimethyleneterephthalate), poly(butylenadipate-co-terephthalate), poly(butylensuccinate-co-terephthalate), poly(butylensebacate-co-terephthalate), lactic acid caprolactone lactic acid copolymers, lactic acid ethylene oxide lactic acid copolymers, and mixtures or blends thereof. Particular examples of the plastic material for the at least one peripheral layer are polyethylene, a thermoplastic vulcanizate, styrene ethylene butylene styrene block copolymers, poly(butylenadipate-co-terephthalate), lactic acid caprolactone lactic acid copolymers, and mixtures or blends thereof. If desired, said at least one peripheral layer can be formed from a transparent material. Furthermore, the material selected for said at least one peripheral layer may be different from that of the core member.

In order to form bottle closures comprising a core member and at least one peripheral layer with some or all of the desirable inherent physical and chemical properties detailed above, it has been found advantageous to comprise metallocene catalyst polyethylene in at least one peripheral layer. As detailed herein, at least one peripheral layer may comprise substantially metallocene catalyst polyethylene as single component or, if desired, the metallocene catalyst polyethylene may be combined with one or more thermoplastic elastomers, particularly with one or more thermoplastic elastomers as detailed above. In this regard, it has been found advantageous that at least one peripheral layer particularly comprises one or more polyethylenes selected from the group consisting of medium density polyethylenes, medium low density polyethylenes, and low density polyethylenes in an amount in the range of from about 5% to about 100% by weight, particularly in the range of from about 5% to about 80% by weight, particularly in the range of from about 10% to about 60% by weight, particularly in the range of from about 15% to about 40% by weight, based upon the weight of the entire composition.

In order to form bottle closures comprising a core member and at least one peripheral layer with some or all of the desirable inherent physical and chemical properties detailed above, it has been found advantageous to comprise poly(butyleneadipate-co-terephthalate) (PBAT) in at least one peripheral layer. As detailed herein, at least one peripheral layer may comprise substantially PBAT as single component or, if desired, the PBAT may be combined with one or more thermoplastic elastomers, particularly with one or more thermoplastic elastomers as detailed above, particularly with one or more biodegradable thermoplastic elastomers as detailed above. In this regard, it has been found advantageous that at least one peripheral layer particularly comprises one or more polyesters selected from the group of biodegradable polyesters in an amount in the range of from about 5% to about 100% by weight, particularly in the range of from about 15% to about 95% by weight, particularly in the range of from about 25% to about 90% by weight, based upon the weight of the entire composition.

In an exemplary construction of this embodiment, the particular PBAT employed for forming the at least one peripheral layer comprises Ecoflex®, which is sold by BASF Corporation of Wyandotte, Mich. (US). This compound has been found to produce an outer layer in combination with the core member which provides at least one, particularly more than one, particularly almost all or even all of the physical and chemical characteristics suitable for attaining a highly effective closure for the wine industry.

A formulation which has been found to be highly effective in providing a peripheral layer comprises at least one lactic acid and/or at least one styrene block copolymer. Suitable styrene block copolymers which come into consideration can be selected from the group consisting of styrene ethylene butadiene styrene block copolymers, styrene ethylene butylene styrene block copolymers, styrene ethylene butylene block copolymers, styrene butadiene styrene block copolymers, styrene butadiene block copolymers, styrene isobutylene block copolymers, styrene isoprene styrene block copolymers, styrene isoprene block copolymers, styrene ethylene propylene styrene block copolymers, styrene ethylene propylene block copolymers and combinations of two or more thereof. In particular aspects of the present disclosure, the at least one styrene block copolymer is selected from the group consisting of styrene ethylene butadiene styrene block copolymers, styrene ethylene butylene styrene block copolymers, styrene ethylene propylene styrene block copolymers, styrene ethylene propylene block copolymers and combinations of two or more thereof. Examples of commercially available styrene block copolymers according to the present disclosure are SBS, SIS, SEBS, SIBS, SEPS, SEEPS, MBS, which are available, for example under the trade names Styroflex® and Styrolux® (BASF Corporation of Wyandotte, Mich., USA), Septon® Q, Septon® V, and Hybar (Kuraray America, Inc., Houston, Tex., USA), Maxelast® TPE (Nantong Polymax Elastomer Technology Co., Ltd), GLOBALPRENE® Polymers (LCY Chemical Corporation), Elexar® and Monprene® (Teknor Apex Company), Elastocon® series (Elastocon TPE Technologies, Inc.), TPR (Washington Pa.), Evoprene™ (Alpha Gary), Versaflex®, OnFlex®, Versalloy®, Versollan®, Dynaflex® (GLS Thermoplastic Elastomers), Sevrene™ (Vichem Corporation), Vector™ (Dexco Polymers LP), Calprene® and Solprene® (Dynasol), Multiflex® TEA and Multiflex® TPE (Multibase, Inc.), Europrene® Sol T (Polimeri Europe), Sunprene™ (PolyOne), Leostomer® (Riken Technos Corporation), RTP 2700 and 6000 series (RTP), Invision® (A. Schulman), Dryflex® (VTC Elastotechnik), Quintac® (Zeon), Megol® and Raplan® (API spa), Asaprene™ and Tufprene™ (Asahi Kasei), Lifoflex (Müller Kunststoffe, Germany), Thermolast® (Kraiburg TPE GmbH & Co. KG, Waldkraiberg, Germany) or Kraton®, for example Kraton® D, Kraton® G or Kraton® FG (Kraton Polymers, Houston, Tex., USA). Suitable lactic acid copolymers which come into consideration can be selected from the group consisting of lactic acid caprolactone lactic acid block copolymers, lactic acid ethylene oxide lactic acid block copolymers, and mixtures thereof. Further sources for biodegradable polymers can be found in "Bio-Based Plastics: Materials and Applications", Stephan Kabasci, editor, John Wiley & Sons, 2014, ISBN 978-1119994008.

Another formulation which has been found to be highly effective in providing a peripheral layer comprises at least one thermoplastic vulcanizate.

Another formulation which has been found to be highly effective in providing a peripheral layer which provides at least one, particularly more than one, particularly almost all or even all physical and chemical attributes to attain a commercially viable closure comprises at least one of at least one polyether-type thermoplastic polyurethane and at least one olefin block copolymer or a blend of at least two thereof.

Each of the materials disclosed as suitable for a peripheral layer can be used alone or in combination with one or more of these materials. By employing this material or these materials and forming the material or the materials in peripheral, surrounding, bonded engagement with any desired foamed core member, a highly effective, multi-layer closure can be attained which is able to provide at least one, particularly more than one, particularly almost all or even all properties suitable for a wine bottle closure.

In an exemplary construction of this embodiment, the particular polyether-type thermoplastic polyurethane employed for forming the at least one peripheral layer comprises Elastollan® LP9162, manufactured by BASF Corporation of Wyandotte, Mich. (US). This compound has been found to produce an outer layer in combination with the core member which provides at least one, particularly more than one, particularly almost all or even all of the physical and chemical characteristics suitable for attaining a highly effective closure for the wine industry.

In another exemplary aspect of the disclosed closure comprising a core member and at least one peripheral layer, the peripheral layer comprises thermoplastic vulcanizates (TPV). Such thermoplastic vulcanizates are well known in the art and are commercially available, for example, under the trade name Santoprene® from ExxonMobil Chemical Company of Houston, Tex. (US), Sarlink® from Teknor Apex B.V., Geleen (NL) or OnFlex® from PolyOne Inc. of Avon Lake, Ohio (US).

In addition to employing the polyether-type thermoplastic polyurethane detailed above, another composition that has been found to be highly effective in providing at least one, particularly more than one, particularly almost all or even all of the desirable attributes for at least one peripheral layer is a blend of at least one polyolefin, particularly at least one thermoplastic polyolefin and at least one thermoplastic vulcanizate. In the exemplary aspect, the blend of at least one thermoplastic polyolefin and at least one thermoplastic vulcanizate comprises the thermoplastic polyolefin in an amount in the range of from about 10% to about 90% by weight, particularly in an amount in the range of from about 20% to about 80% by weight, particularly in an amount in the range of from about 30% to about 70% by weight, particularly in an amount in the range of from about 40% to about 60% by weight, based upon the weight of the entire composition and the thermoplastic vulcanizate in an amount in the range of from about 90% to about 10% by weight, particularly in an amount in the range of from about 80% to about 20% by weight, particularly in an amount in the range of from about 70% to about 30% by weight, particularly in an amount in the range of from about 60% to about 50% by weight, based upon the weight of the entire composition. The construction of a closure using a peripheral layer formed from this blend provides a closure which is highly suitable for use as a wine bottle closure.

A further composition that has been found to be highly effective in providing at least one, particularly more than one, particularly almost all or even all of the desirable attributes for at least one peripheral layer is a blend of at least one polyolefin, particularly at least one thermoplastic polyolefin, and at least one styrene block copolymer, or a blend of at least one thermoplastic vulcanizate and at least one styrene block copolymer. In the exemplary aspect, the blend of at least one polyolefin or at least one thermoplastic vulcanizate and at least one styrene block copolymer comprises the polyolefin or the thermoplastic vulcanizate in an amount in the range of from about 5% to about 95% by weight, or in an amount in the range of from about 20% to about 80% by weight, or in an amount in the range of from about 30% to about 70% by weight, or in an amount in the range of from about 40% to about 60% by weight, based upon the weight of the entire composition of and the styrene block copolymer in an amount in the range of from about 95% to about 5% by weight, particularly in an amount in the range of from about 80% to about 20% by weight, particularly in an amount in the range of from about 70% to about 30% by weight, particularly in an amount in the range of from about 60% to about 40% by weight, based upon the weight of the entire composition. Exemplary weight ratios of styrene block copolymer to polyolefin or thermoplastic vulcanizate are about 95:5, about 90:10, about 85:15, about 80:20, about 75:25, about 70:30, about 65:35, about 60:40, about 55:45, about 50:50, based on the total weight of styrene block copolymer and polyolefin or styrene block copolymer and thermoplastic vulcanizate. The construction of a closure using a peripheral layer formed from this blend provides a closure which is highly suitable for use as a wine bottle closure.

In a further alternate embodiment, a highly effective closure is attained by employing at least one of at least one metallocene catalyst polyethylene and at least one olefin block copolymer, either independently or in combination with at least one selected from the group consisting of low density polyethylenes, medium density polyethylenes, and medium low density polyethylenes.

A further composition that has been found to be highly effective in providing at least one, particularly more than one, particularly almost all or even all of the desirable attributes for at least one peripheral layer is a blend of at least one polyester, particularly at least one statistical aromatic-aliphatic copolyester, and at least one lactic acid block copolymer. In the exemplary aspect, the blend of at least statistical aromatic-aliphatic copolyester, and at least one lactic acid block copolymer comprises the statistical aromatic-aliphatic copolyester in an amount in the range of from about 5% to about 95% by weight, or in an amount in the range of from about 20% to about 80% by weight, or in an amount in the range of from about 30% to about 70% by weight, or in an amount in the range of from about 40% to about 60% by weight, based upon the weight of the entire composition of and the lactic acid block copolymer in an amount in the range of from about 95% to about 5% by weight, particularly in an amount in the range of from about 80% to about 20% by weight, particularly in an amount in the range of from about 70% to about 30% by weight, particularly in an amount in the range of from about 60% to about 40% by weight, based upon the weight of the entire composition. Exemplary weight ratios of lactic acid block copolymer to statistical aliphatic-aromatic copolyester are about 95:5, about 90:10, about 85:15, about 80:20, about 75:25, about 70:30, about 65:35, about 60:40, about 55:45, about 50:50, based on the total weight of lactic acid block copolymer and statistical aliphatic-aromatic copolyester. The construction of a closure using a peripheral layer formed from this blend provides a closure which is highly suitable for use as a wine bottle closure, particularly a biodegradable wine bottle closure.

Still further additional compounds which have been found to provide highly effective peripheral layers for forming closures, in accordance with the present disclosure, comprise Teflon®, fluoroelastomeric compounds, and fluoropolymers. These compounds, whether employed individually or in combination with each other or with the other compounds detailed above have been found to be highly effective in producing a peripheral layer which is capable of providing at least one, particularly more than one, particularly almost all or even all of the properties making it suitable for bottle closures.

Any of the compounds detailed herein for providing the at least one peripheral layer can be employed alone or in combination with each other, using suitable preparation methods detailed herein to produce a peripheral layer which is securely and integrally bonded to the core member and/or to a different peripheral layer, as a foamed outer layer or a non-foamed outer layer, or as an intermediate layer.

According to a particular aspect of the present disclosure, said at least one thermoplastic polymer comprised in the peripheral layer is biodegradable according to ASTM D6400.

Depending upon the sealing process to be employed for inserting the closure of the present disclosure in a desired bottle, additives, such as slip additives, lubricating agents, and sealing compounds may be incorporated into at least one outer, peripherally surrounding layer of the closure of the present disclosure comprising a core member and at least one peripheral layer, for example to provide lubrication of the closure during the insertion process. In addition, other additives typically employed in the bottling industry may also be incorporated into the closure of the present disclosure for improving the sealing engagement of the closure with the bottle as well as reducing the extraction forces necessary to remove the closure from the bottle for opening the bottle.

The at least one peripheral layer, if present, particularly the outer peripheral layer is particularly formed with a thickness and/or a density which are capable of imparting desired physical characteristics, such as resistance to bottling conditions, to the closure of the present disclosure. The at least one peripheral layer, particularly the outer peripheral layer is, in particular, formed with a substantially greater density than the inner core and/or with a selected thickness.

Accordingly, said at least one peripheral layer, if present, is particularly further defined as comprising a thickness ranging from about 0.05 mm to about 5 mm. Although this range has been found to be efficacious for producing a closure which is completely functional and achieves most or all of the desired goals, the exemplary aspect for wine bottles particularly comprises a thickness ranging from about 0.05 mm to about 2 mm, whereby exemplary lower limits for the thickness are about 0.05 mm, about 0.06 mm, about 0.07 mm, about 0.08 mm, about 0.09 mm, about 0.1 mm, about 0.2 mm, about 0.3 mm, about 0.4 mm or about 0.5 mm and exemplary upper limits for the thickness are about 1 mm, about 2 mm, about 3 mm, about 4 mm, or about 5 mm. The exemplary thickness of the at least one peripheral layer, if present, can be selected according to criteria such as, for example, the composition, physical properties and/or density of the material of the at least one peripheral layer, and the desired properties of the at least one peripheral layer.

If a peripheral layer is present, the present disclosure particularly provides a peripheral layer with a tough, score and mar resistant surface. In this respect, it is advantageous according to this aspect of the present disclosure that said at least one peripheral layer is further defined as comprising a tough, score and mar resistant surface and/or a density ranging from about 300 kg/m$^3$ to about 1,500 kg/m$^3$, more particularly from about 505 kg/m$^3$ to about 1250 kg/m$^3$, and most particularly from about 750 kg/m$^3$ to about 1100 kg/m$^3$.

In a specific embodiment of the present disclosure, the closure is biodegradable according to ASTM D6400.

It has also been found that further additional additives may be incorporated into the closure of the present disclosure. For a closure according to the disclosure comprising a core member and at least one peripheral layer, the additives may be incorporated into either the core member and/or the at least one peripheral layer of the closure in order to provide further enhancements and desirable performance characteristics. These additional additives incorporate antimicrobial agents, antibacterial compounds, and/or further oxygen scavenging materials. Suitable additives are known to the person skilled in the art. The antimicrobial and antibacterial additives can be incorporated into the closure to impart an additional degree of confidence that in the presence of a liquid the potential for microbial or bacterial growth is extremely remote. These additives have a long-term time release ability and further increase the shelf life without further treatments by those involved with the bottling of wine. Furthermore, it is possible for the cells of the closure to be substantially filled with a non-oxidizing gas, in order to further reduce oxygen ingress into the container. Ways of achieving this are known in the prior art.

As discussed herein, intimate bonded interengagement of the at least one peripheral layer, if present, to the core member is advantageous for providing a bottle closure capable of being used in the wine industry. In this regard, although it has been found that the methods detailed herein provide secure intimate bonded interengagement of the at least one peripheral layer to the core member, alternative layers or bonding chemicals can be employed, depending upon the particular materials used for forming the core member and the at least one peripheral layer.

If desired, for a disclosed closure comprising a core member and at least one peripheral layer, bonding agents or tie layers known to the skilled person can be employed on the outer surface of the core member in order to provide secure intimate bonded interengagement of the at least one peripheral layer therewith. If a tie layer is employed, the tie layer would effectively be interposed between the core member and the at least one peripheral layer to provide intimate bonded interengagement by effectively bonding the peripheral layer and the core member to the intermediately positioned tie layer. However, regardless of which process or bonding procedure is employed, all of these alternate embodiments are within the scope of the present disclosure. If more than one peripheral layer is present, such bonding agents or tie layers can similarly be employed between respective peripheral layers.

In addition, the closures according to the present disclosure may also comprise decorative indicia such as letters, symbols, colors, graphics, and wood tones printed on at least one substantially cylindrical surface and/or one of the substantially flat terminating surfaces forming the opposed ends of said closure or stopper. If present, at least one peripheral layer can be in overlying relationship with the indicia printed on the substantially cylindrical surface. Printing of these indicia can be performed in-line, during production of the closure or in a separate step after the closure has been manufactured. Accordingly, the closure of the present disclosure may comprise a decorative effect on at least one of the substantially cylindrical surface and the substantially flat terminating surfaces forming the opposed ends of said closure or stopper. Additionally, indicia comprising ink that is invisible under normal lighting and/or temperature conditions can be comprised in the closure. Normal lighting conditions in the context of this disclosure means light from a light source having a spectrum that substantially comprises the visible range of the spectrum. Normal temperature conditions in the context of this disclosure means a temperature from 10° C. to 35° C. These indicia can, for example, be useful as registration marks.

The closure according to the present disclosure can further comprise a silicone layer on at least one of its surfaces, in particular on its peripheral surface. Such a layer can help for example with insertion of the closure into a container. If a silicone layer is present, this is particularly formed by extrusion and/or by tumbling.

By employing the materials disclosed herein as at least one further polymer or copolymer and forming the combined material in peripheral, surrounding, bonded engagement with any desired foamed core member, a highly effective, multi-layer closure can be attained which is able to provide at least one, particularly more than one, particularly almost all or even all properties suitable for a wine bottle closure.

The closure according to the present disclosure advantageously has an oxygen transfer rate (OTR) in axial direction as determined by Mocon measurement according to ASTM F-1307 using 100% oxygen of from about 0.0001 cc/day/closure to about 0.1000 cc/day/closure, in particular from about 0.0005 cc/day/closure to about 0.050 cc/day/closure.

Advantageously, the closure according to the present disclosure has an extraction force determined according to the herein described test method of not more than about 400 N, particularly of not more than about 390 N, particularly of not more than about 380 N, particularly of not more than about 370 N, particularly of not more than about 360 N, particularly of not more than about 350 N, particularly of not more than about 340 N, particularly of not more than about 330 N, more particularly of not more than about 320 N, more particularly of not more than about 310 N, more particularly of not more than about 300 N, whereby extraction forces in the range of from about 200 N to about 400 N, particularly in the range of from about 210 N to about 380 N, particularly in the range of from about 220 N to about 350 N, particularly in the range of from about 230 N to about 300 N are advantageously achieved. The extraction force describes the force needed to remove a closure from a container, in particular from a bottle, under standardized conditions. A lower extraction force relates to a greater ease of extraction of the closure. An extraction force in the range of from about 200 N to about 400 N is generally considered acceptable for a wine bottle closure. The presently disclosed closures thus achieve extraction force within the range considered acceptable for wine bottle closures.

The present disclosure further relates to methods for producing a closure according to the present disclosure. In one embodiment of the method of the present disclosure (herein referred to as method A), said method comprises at least the steps of
  a. combining at least one natural organic filler with a least one thermoplastic polymer to obtain a polymer composition;
  b. optionally, adding at least one blowing agent to the polymer composition;
  c. heating the composition provided in step a. or b. to obtain a heated composition;
  d. introducing the heated composition into a mold;
  e. forming the closure inside the mold; and
  f. demolding the closure.

The details regarding the at least one thermoplastic polymer in the closure provided in method step a. of method A are the same as the details for the thermoplastic polymer described herein for the closure of the present disclosure. If a combination of thermoplastic polymers is used, the composition provided in method step a. comprises this combination.

The details regarding the at least one natural organic filler provided in method step a. of method A are the same as those described herein for the closure of the present disclosure. Before combining the natural organic filler in method step a. it is conceivable to carry out at least one step of treating the natural organic filler, in particular to remove all or substantially all oils and/or sensory constituents. Examples for sensory constituents are described hereinabove with respect to the closure of the present disclosure. Suitable treatments to obtain a natural organic filler that is free from oils and/or sensory constituents are described hereinabove with respect to the closure of the present disclosure.

According to a particular aspect of method step a. of method A of the present disclosure a masterbatch of the polymer composition can be prepared, for example in the form of pellets, or any other form suitable for subsequent injection molding to form a closure, in which the natural organic filler is already compounded with a polymer. The compounding can take place by means of mixing, pultrusion, extrusion, or any other method known to the skilled person and appearing suitable. Method step a. can be carried out discontinuously with subsequent method steps, for example a masterbatch can be pre-prepared and optionally stored before further method steps. If a masterbatch is prepared, the masterbatch can also be envisioned to comprise further components. For example, one or more of a fatty acid, a fatty acid derivative, expandable microspheres and one or more blowing agents can conceivably be combined with the masterbatch components in method step a., i.e. at the same time as the natural organic filler combining. If one or more of expandable microspheres and at least one blowing agent are combined in method step a., care must be taken that the temperature to make the masterbatch, for example the extrusion temperature to make the masterbatch, is below the initiation temperature for the expandable microspheres and/or the blowing agent or agents. These initiation temperatures depend on the microspheres and blowing agents and are known or available to the skilled person. Alternatively, method step a. can be carried out continuously with subsequent method steps, in which case, for example, natural organic filler and a polymer are combined and supplied continuously to subsequent method steps.

The details regarding the blowing agent provided in method step b. of method A are the same as the details for the blowing agent described herein with respect to the closure of the present disclosure. Further additives can also be provided in method step b., such as, for example, at least one nucleating agent. Details regarding such additives are the same as the details regarding additives described herein with respect to the closure of the present disclosure. If a masterbatch is prepared in method step a. the blowing agent can be provided to the polymer composition in such a way that it is comprised in the masterbatch.

If a fatty acid or a fatty acid derivative should be present in the closure according to the disclosure, this is advantageously provided in one of method steps a. or b. of method A. Details regarding suitable fatty acids and fatty acid derivatives are the same as the details regarding suitable fatty acids and fatty acid derivatives described herein with respect to the closure of the present disclosure. If a masterbatch is prepared in method step a., a fatty acid or a fatty acid derivative is advantageously provided such that it is present in the masterbatch.

The heating in method step c. of method A preferably occurs to a temperature at which the compositions obtained in method steps a. or b. are soft enough to enable foaming to the desired density and/or injection molding of the respective composition. If a blowing agent is used which requires heat to provide the blowing effect, the heating in method step c. preferably occurs to a temperature at which this blowing effect can occur. Suitable temperatures depend principally on the thermoplastic polymer and blowing agent selected and can be easily determined by the skilled person based on the known properties of the thermoplastic polymer and blowing agent and/or based on simple trials. In an aspect of the disclosed method where a natural organic filler is comprised in the composition to be heated in method step c., the heating in method step c. particularly does not exceed a temperature of 170° C.

In another embodiment of the method of the present disclosure for producing a closure according to the present disclosure comprising at least one thermoplastic polymer and at least one natural organic filler (herein referred to as method B), said method comprises at least the steps of:

a. providing a core member composition comprising at least one thermoplastic polymer;
b. optionally, adding at least one natural organic filler to the core member composition;
c. adding at least one blowing agent to the core member composition;
d. heating the core member composition to obtain a heated composition;
e. extruding a continuous, elongated, substantially cylindrically shaped length of the heated composition to obtain, as core member, a continuous elongated length of the core member composition having a cylindrical surface;
f. optionally, providing a peripheral layer composition comprising at least one thermoplastic polymer;
g. optionally, adding at least one natural organic filler to the peripheral layer composition;
h. optionally, extruding a separate and independent peripheral layer of the peripheral layer composition separately to, co-axially to and in intimate bonded engagement with the continuous, elongated length of material obtained in method step e., said separate and independent peripheral layer peripherally surrounding and substantially enveloping the cylindrical surface of the continuous, elongated length of the material obtained in method step e. to obtain a multi-component elongated structure having a cylindrical surface;
i. cutting the continuous elongated length of material obtained in method step e. or the multi-component elongated structure obtained in method step h. in a plane substantially perpendicular to the central axis of said multi-component elongated structure to obtain a closure; and
j. optionally printing, coating, and/or post-treating at least one of the continuous elongated length of material obtained in method step e., the multi-component structure obtained in method step h. and the closure obtained in method step i.

The details regarding the at least one thermoplastic polymer in the core member composition provided in method step a. of method B are the same as the details for the thermoplastic polymer described herein for the core member of the closure of the present disclosure. If a combination of thermoplastic polymers is used, the composition provided in method step a. comprises this combination.

The details regarding the natural organic filler optionally provided in method step b. of method B are the same as those disclosed in the present disclosure for the natural organic filler with respect to the closure of the present disclosure. Before adding the natural organic filler in method step b. it is conceivable to carry out at least one step of treating the natural organic filler, in particular to remove all or substantially all oils and/or sensory constituents. Examples for sensory constituents are described hereinabove with respect to the closure of the present disclosure. Suitable treatments to obtain a natural organic filler that is free from oils and/or sensory constituents are described hereinabove with respect to the closure of the present disclosure.

According to a particular aspect of method step b. of method B of the present disclosure a masterbatch of the core member composition can be prepared, for example in the form of pellets, or any other form suitable for subsequent extrusion to form a core member, in which the natural organic filler is already compounded with a polymer. The compounding can take place by means of mixing, pultrusion, extrusion, or any other method known to the skilled person and appearing suitable. Method step b. can be carried out discontinuously with subsequent method steps, for example a masterbatch can be pre-prepared and optionally stored before further method steps. If a masterbatch is prepared, the masterbatch can also be envisioned to comprise further components. For example, one or more of a fatty acid, a fatty acid derivative, expandable microspheres and one or more blowing agents can conceivably be combined with the masterbatch components in method step b., i.e. at the same time as the combining with the natural organic filler. If one or more of expandable microspheres and at least one blowing agent are combined in method step b., care must be taken that the temperature to make the masterbatch, for example the extrusion temperature to make the masterbatch, is below the initiation temperature for the expandable microspheres and/or the blowing agent or agents. These initiation temperatures depend on the microspheres and blowing agents and are known or available to the skilled person. Alternatively, method step b. of method B can be carried out continuously with subsequent method steps, in which case, for example, natural organic filler and a core member composition are combined and supplied continuously to subsequent method steps.

The details regarding the blowing agent added in method step c. of method B are the same as the details for the blowing agent described herein with respect to the closure of the present disclosure. Further additives can also be provided in method step c., such as, for example, at least one nucleating agent. Details regarding such additives are the same as the details regarding additives described herein with respect to the closure of the present disclosure. If a masterbatch is prepared in method step b. the blowing agent can be provided to the core member composition in such a way that it is comprised in the masterbatch.

If a fatty acid or a fatty acid derivative should be present in the closure according to the disclosure, this is advantageously provided in one of method steps a. to c. and/or method steps f. or g. of method B. Details regarding suitable fatty acids and fatty acid derivatives are the same as the details regarding suitable fatty acids and fatty acid derivatives described herein with respect to the closure of the present disclosure. If a masterbatch is prepared in method step b., a fatty acid or a fatty acid derivative is advantageously provided such that it is present in the masterbatch.

The heating in method step d. of method B preferably occurs to a temperature at which the composition provided in method step a. or the composition obtained in method steps b. or c. are soft enough to enable foaming to the desired density and/or extrusion of the respective composition. If a blowing agent is used which requires heat to provide the blowing effect, the heating in method step d. preferably occurs to a temperature at which this blowing effect can occur. Suitable temperatures depend principally on the thermoplastic polymer and blowing agent selected and can be easily determined by the skilled person based on the known properties of the thermoplastic polymer and blowing agent and/or based on simple trials. In an aspect of the disclosed method where a natural organic filler is comprised in the composition to be heated in method step d., the heating in method step d. particularly does not exceed a temperature of 170° C.

Method step e. of method B can occur in any way known to the skilled person and appearing suitable, in particular using known extrusion equipment.

The details regarding the peripheral layer composition provided in method step f. of method B are the same as the details regarding suitable materials, compounds and compositions described herein with respect to the at least one peripheral layer of the closure comprising a core member and at least one peripheral layer of the present disclosure.

The details regarding the natural organic filler optionally added to the peripheral layer composition in method step g. of method B are the same as those disclosed in the present disclosure for the natural organic filler including the optional treatment steps for the natural organic filler.

According to a particular aspect of method step g. of method B of the present disclosure a masterbatch of the peripheral layer composition can be prepared, for example in the form of pellets, or any other form suitable for subsequent extrusion to form a peripheral layer, in which the natural organic filler is already compounded with a polymer. The compounding can take place by means of mixing, pultrusion, extrusion, or any other method known to the skilled person and appearing suitable. Method step g. can be carried out discontinuously with subsequent method steps, for example a masterbatch can be pre-prepared and optionally stored before further method steps. Alternatively, method step g. can be carried out continuously with subsequent method steps, in which case, for example, a natural organic filler and a peripheral layer composition are combined and supplied continuously to subsequent method steps.

Method step h. of method B can occur in any way known to the skilled person and appearing suitable, in particular using known extrusion equipment.

According to an aspect of method B of the present disclosure, method step h. occurs substantially simultaneously with method step e.

According to a further aspect of method B of the present disclosure, method step h. occurs after method step e.

According to a further aspect of method B of the present disclosure, method step h. can be repeated one or more times in order to obtain one or more further peripheral layers, whereby the one or more further peripheral layers are separately extruded in intimate bonded engagement with the cylindrical outer surface of the multi-component elongated structure to form a multilayer elongated length of material.

After the extrusion in method step e. and/or in method step h. of method B, the continuous elongated length of thermoplastic polymer or the multi-component elongated structure can be cooled by methods known to the skilled person. These include, for example, passing through a cooling bath, spraying, blowing and the like.

The cutting in method step i. of method B and the optional printing, coating, and/or post-treating of method step j. of method B can be carried out in any way known and appearing suitable to the skilled person. Post-treating can comprise, for example, surface treatments such as plasma treatment, corona treatment, and/or providing a lubricant to the surface of the closure. If the core member and/or the peripheral layer comprises a natural organic filler, it may be desirable to use branding to impart an image or writing onto the cylindrical surface or one or both flat surfaces of the closure, for example using branding methods known for natural cork closures.

Method B as disclosed herein can further comprise a method step of maintaining an extrusion temperature in the range of from about 100° C. to about 200° C., in particular from about 120° C. to about 170° C. The maintaining of an extrusion temperature in this range is particularly envisaged during extrusion of any composition comprising natural organic filler. In this way, for example, discoloration can be avoided. Should discoloration occur this can be at least partially corrected, for example by addition of colorants or other additives.

All details disclosed herein for the closures according to the present disclosure are also relevant for the methods according to the present disclosure and therefore also form part of the disclosure of the methods disclosed herein.

The present disclosure also relates to closures produced according to the methods as described herein.

According to a further aspect of the closure comprising a core member and at least one peripheral layer according to the present disclosure or produced according to the method according to the present disclosure, the closure comprises the peripheral layer surrounding and intimately bonded to the cylindrical surface of the core member and the end surfaces of the core member are devoid of said layer.

The present disclosure also relates to a use of a closure as disclosed herein or produced according to a method described herein for sealing closed a container.

According to the present disclosure, a closure can be realized which is capable of providing at least one, particularly more than one, particularly almost all or even all of the needs imposed thereupon by the wine industry, as well as any other bottle closure/packaging industry. As a result, a bottle closure can be attained that can be employed for completely sealing and closing a desired bottle for securely and safely storing the product retained therein, optionally with desired markings and/or indicia printed thereon. The disclosure herein concerning the closures of the present disclosure also applies to the closures prepared by the presently disclosed methods. The disclosure herein concerning the closures prepared by the presently disclosed methods also applies to the closures of the present disclosure.

The present disclosure accordingly comprises an article of manufacture possessing the features, properties, and relation of elements which will be exemplified in the article herein described, and the scope of the present disclosure will be indicated in the claims.

BRIEF DESCRIPTION OF THE DRAWINGS

For a fuller understanding of the nature and objects of the present disclosure herein described, reference should be had to the following detailed description taken in connection with the accompanying drawings, in which.

DETAILED DESCRIPTION

By referring to the FIGURES, along with the following detailed disclosure, the construction and production method for the closures of the present disclosure can best be understood. In these Figures, as well as in the detailed disclosure herein, the closure of the present disclosure, is depicted and discussed as a bottle closure for wine products. However, as detailed herein, the present disclosure is applicable as a closure for use in sealing and retaining any desired product in any desired closure system. However, due to the stringent and difficult demands placed upon closures for wine products, the detailed disclosure herein focuses upon the applicability of the bottle closures of the present disclosure as a closure for wine bottles. However, it is to be understood that this detailed discussion is provided merely for exemplary purposes and is not intended to limit the present disclosure to this particular application and embodiment.

Figure 1:
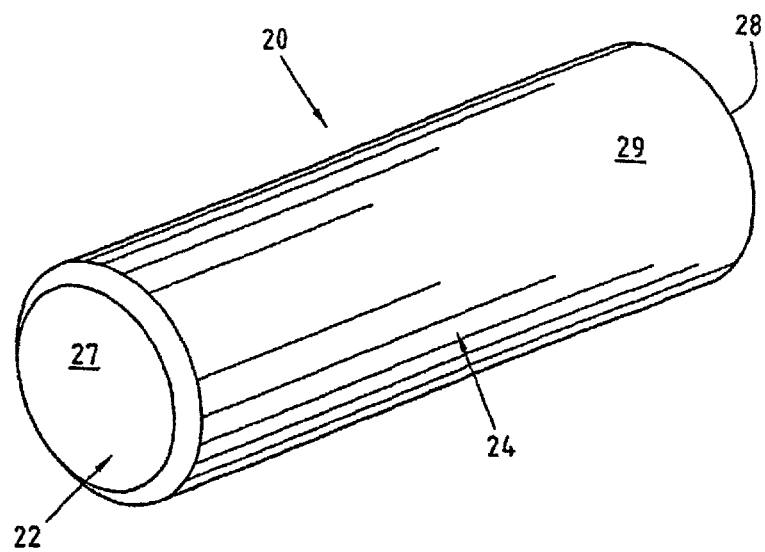
FIG. 1 is a perspective view of a closure according to an aspect of the present disclosure.
Figure 2:
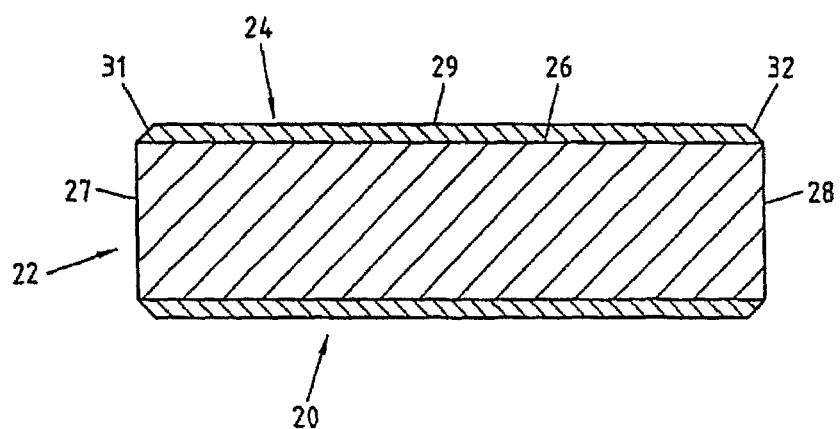
FIG. 2 is a cross sectional-side elevation of a closure according to an aspect of the present disclosure.

In FIGS. 1 and 2, the exemplary construction of a closure 20 is depicted comprising a generally cylindrical shape formed by core member 22 and peripheral layer 24 which peripherally surrounds and is intimately bonded to core member 22. In the exemplary aspect, core member 22 comprises a substantially cylindrically shaped surface 26, terminating with substantially flat end surfaces 27 and 28. Whenever applicable, the following detailed description of a closure having a layered structure, i.e. a core member and a peripheral layer, shall also apply to multilayer closures having more than one peripheral layer.

In an exemplary aspect, peripheral layer 24 is intimately bonded directly to core member 22, peripherally surrounding and enveloping surface 26 of core member 22. Peripheral layer 24 incorporates exposed surface 29, which comprises a substantially cylindrical shape and forms the outer surface of bottle closure 20 of the present disclosure, along with surfaces 27 and 28 of the substantially flat terminating ends.

In order to assist in assuring entry of bottle closure 20 into the portal of the bottle into which closure 20 is inserted, terminating edge 31 of peripheral layer 24 may be beveled or chamfered. Similarly, terminating edge 32 of peripheral layer 24 also may comprise a similar bevel or chamfer. Although any desired bevel or chamfered configuration can be employed, such as a radius, curve, or flat surface, it has been found that by merely cutting ends 31 and 32 with an angle of about 45° or about 60° the desired reduced diameter area is provided for achieving the desired effect. The chamfer angle and the chamfer length, i.e. the length of the chamfered surface as measured between surface 26, or surface 29 if a peripheral layer is comprised, are exemplarily within the ranges described herein for still wine closures or champagne closures.

By incorporating chamfered or beveled ends 31 and 32 on bottle closure 20, automatic self-centering is attained. As a result, when bottle closure 20 is compressed and ejected from the compression jaws into the open bottle for forming the closure thereof, bottle closure 20 is automatically guided into the bottle opening, even if the clamping jaws are slightly misaligned with the portal of the bottle. By employing this configuration, unwanted difficulties in inserting bottle closure 20 into any desired bottle are obviated. However, in applications which employ alternate stopper insertion techniques, chamfering of ends 31 and 32 may not be needed. Further, in order to facilitate the insertion of the closure into the bottle neck, the outer surface can fully or partly be coated with suitable lubricants, in particular with silicones. Coating with lubricants such as silicones can be carried out by a variety of techniques known in the art, including tumbling and/or extrusion coating. For closures for champagne or sparkling wine, a crosslinkable silicone is advantageously used since silicone can act as an antifoaming agent.

In order to produce the attributes suitable for use in the wine industry, core 22 is formed from foam plastic material as described herein using a continuous extrusion process. Although other prior art systems have employed molded foamed plastic material, these processes have proven to be more costly and incapable of providing a final product with the attributes of the present disclosure.

In order to demonstrate the efficacy of the present disclosure, samples of bottle closures 20, manufactured in accordance with the present disclosure and having a foamed core member, or a foamed core member and a solid peripheral layer, were produced and tested.

Test Methods:

The Mocon test for OTR/oxygen ingress rate was carried out according to ASTM F-1307. The test for extraction force was carried out on a random sample selection according to the methods described in WO 03/018304 A1 (extraction test, p. 48, 1. 13-p. 49, 1. 10), which are herewith incorporated and form part of the present disclosure.

Extraction Force:

Three empty, clean "Bordeaux" style wine bottles were stoppered using a semi-automatic corking machine (Model 4040 from GAI S.p.A., Italy). The bottles were stored for one hour. The closures were then extracted at ambient temperature using a Dillon AFG-1000N force gauge (from Dillon/Quality Plus, Inc., USA) to measure the force required for extraction.

Surface Roughness:

The surface roughness $R_a$ was determined using a contact profilometer (Manufacturer: Time Group Inc., Model: TR100 Surface Roughness Tester).

Surface Hardness:

The surface hardness is tested at room temperature (25° C.) using a Shore 902 automatic operating stand from Instron according to ASTM D2240-10.

Coefficient of Friction:

The dynamic coefficient of friction was measured according to ASTM D1894-14 at room temperature (25° C.) using an Instron Model 2810 Coefficient of Friction Testing Fixture. For the measurement of the dynamic coefficient of friction, a closure was split in half along its long axis and mounted to a steel plate with the flat side of the interior of the closure. This specimen was then loaded with 200 gram weight and pulled across a stainless steel surface at 15.2 cm/min.

What is claimed is:

1. A cylindrical closure for a product-retaining container constructed for being inserted and securely retained in a portal-forming neck of said container, said closure comprising at least one thermoplastic polymer at least one natural organic filler, a plurality of cells, and a lateral surface, wherein the plurality of cells comprises a cell size in a range from 0.025 mm to 0.5 mm, and said closure comprises at least one of the following features (a) or (b):
   (a) the lateral surface has a hardness in a range from 40 to 90 Shore A, according to ASTM D2240-10; and
   (b) the lateral surface has a dynamic coefficient of friction in a range from 0.35 to 0.7, according to ASTM D1894-14.

2. The cylindrical closure according to claim 1, having a surface roughness Ra measured by contact profilometry in a range from 0.5 µm to 17 µm.

3. The cylindrical closure according to claim 1, wherein said closure has an oxygen ingress rate of less than 3 mg oxygen per container in a first 100 days after being inserted and securely retained in the portal-forming neck of said container to close the container.

4. The cylindrical closure according to claim 3, wherein the oxygen ingress rate is selected from the group consisting of less than 1 mg oxygen, less than 0.5 mg oxygen, less than 0.25 mg oxygen, less than 0.2 mg oxygen, and less than 0.1 mg oxygen, per container in the first 100 days after closing the container.

5. The cylindrical closure according to claim 1, having an overall density from 100 kg/m³ to 800 kg/m³.

6. The cylindrical closure according to claim 1, wherein the plurality of cells is a plurality of substantially closed cells.

7. The cylindrical closure according to claim 1, wherein the plurality of cells comprises a cell size in a range from 0.05 mm to 0.35 mm.

8. The cylindrical closure according to claim 1, wherein the at least one thermoplastic polymer is selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluorelastomers, fluoropolymers, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers, cyclic olefin copolymers, styrene ethylene butadiene styrene block copolymers, styrene ethylene butylene styrene block copolymers, styrene ethylene butylene block copolymers, styrene butadiene styrene block copolymers, styrene butadiene block copolymers, styrene isoprene styrene block copolymers, styrene isobutylene block copolymers, styrene isoprene block copolymers, styrene ethylene propylene styrene block copolymers, styrene ethylene propylene block copolymers, polyvinylalcohol, polyvinylbutyral, polyhydroxyalkanoates, copolymers of hydroxyalkanoates and monomers of biodegradable polymers, poly(lactic acid), copolymers of lactic acid and monomers of biodegradable polymers, aliphatic copolyesters, aromatic-aliphatic copolyesters, and mixtures thereof.

9. The cylindrical closure according to claim 1, wherein the at least one thermoplastic polymer is selected from the group consisting of polyvinylalcohol, polyvinylbutyral, polyhydroxyalkanoates, copolymers of hydroxyalkanoates and monomers of biodegradable polymers, poly(lactic acid), copolymers of lactic acid and monomers of biodegradable polymers, polycaprolactone, polyglycolide, poly(3-hydroxybutyrate), poly(3-hydroxybutyrate-co-3-hydroxyvalerate), poly(3-hydroxybutyrate-co-3-hydroxyhexanoate), poly(butylensuccinate) poly(butylensuccinate-co-adipate), poly(trimethyleneterephthalate), poly(butylenadipate-co-terephthalate), poly(butylensuccinate-co-terephthalate), poly(butylensebacate-co-terephthalate), lactic acid caprolactone lactic acid copolymers, lactic acid ethylene oxide lactic acid copolymers, and mixtures thereof.

10. The cylindrical closure according to claim 1, wherein the at least one thermoplastic polymer is biodegradable according to ASTM D6400.

11. The cylindrical closure according to claim 1, wherein the closure is produced by injection molding.

12. The cylindrical closure according to claim 1, wherein the closure is produced by extrusion.

13. The cylindrical closure according to claim 12, wherein the closure is produced by co-extrusion.

14. The cylindrical closure according to claim 12, wherein the closure is produced by mono-extrusion.

15. The cylindrical closure according to claim 1, wherein said closure comprises:
a. a core member comprising at least one thermoplastic polymer, and
b. at least one peripheral layer at least partially surrounding and intimately bonded to at least one surface of the core member, said at least one peripheral layer comprising at least one thermoplastic polymer,
wherein at least one of (i) the core member or (ii) the at least one peripheral layer comprises the plurality of cells.

16. The cylindrical closure according to claim 15, wherein the at least one natural organic filler is present in at least one of (i) the core member or (ii) the at least one peripheral layer.

17. The cylindrical closure according to claim 15, wherein the at least one natural organic filler is present in the core member and in the at least one peripheral layer.

18. The cylindrical closure according to claim 15, wherein the at least one natural organic filler is present in the core member.

19. The cylindrical closure according to claim 15, wherein the at least one natural organic filler is present in the at least one peripheral layer.

20. The cylindrical closure according to claim 1, wherein the at least one natural organic filler is present in an amount in a range from 0.5 wt. % to 75 wt. %, based on a total weight of the closure.

21. The cylindrical closure according to claim 1, wherein the at least one natural organic filler comprises particles having a particle size measured by a laser diffraction method according to ISO 13320 in a range from 0.1 µm to 2000 µm.

22. The cylindrical closure according to claim 15, wherein the at least one peripheral layer comprises natural organic filler particles with a particle size smaller than 500 µm.

23. The cylindrical closure according to claim 15, wherein the core member comprises natural organic filler particles with a particle size in a range from 100 µm to 2000 µm.

24. The cylindrical closure according to claim 1, wherein the at least one natural organic filler has at least one of the following properties (a) or (b):
(a) a bulk density in a range from 100 kg/m$^3$ to 1500 kg/m$^3$; or
(b) a humidity in a range from 0% to 15%.

25. The cylindrical closure according to claim 1, wherein the at least one natural organic filler comprises a mixture of natural organic filler and a polymer.

26. The cylindrical closure according to claim 1, wherein the at least one natural organic filler is at least partially coated with a polymer.

27. The cylindrical closure according to claim 1, wherein the at least one natural organic filler is substantially free from oils and/or sensory constituents.

28. The cylindrical closure according to claim 1, wherein the at least one natural organic filler comprises at least one ingredient selected from the group consisting of grape seed flour, grape skin powder, grape pomace flour, rice hull flour, oat hull flour, peanut hull flour, soybean hull flour, starch flour, corn starch flour, cellulose flour, microcrystalline cellulose, nanocellulose, wood flour, rice straw flour, corn cob flour, cricket flour, bagasse flour, kenaf flour, and hemp flour.

29. The cylindrical closure according to claim 1, wherein the at least one natural organic filler comprises grape seed flour.

30. The cylindrical closure according to claim 29, wherein the grape seed flour is substantially free from oils and/or sensory constituents.

31. The cylindrical closure according to claim 15, wherein the closure is produced by a process comprising at least a process step of extrusion.

32. The cylindrical closure according to claim 15, wherein said core member and said at least one peripheral layer are extruded substantially simultaneously, or said core member is extruded separately to yield a pre-formed core member and subsequent thereto said at least one peripheral layer is formed in extrusion equipment peripherally surrounding and enveloping the pre-formed core member.

33. The cylindrical closure according to claim 31, wherein the closure is produced by a process comprising at least a process step of maintaining an extrusion temperature in a range from 100° C. to 200° C.

34. The cylindrical closure according to claim 15, wherein the core member comprises a plurality of cells.

35. The cylindrical closure according to claim 34, wherein at least one of a size or a distribution of the plurality of cells in the core member is substantially uniform throughout at least one of a length or a diameter of the core member.

36. The cylindrical closure according to claim 15, wherein the core member comprises closed cells having at least one of an average cell size ranging from 0.02 mm to 0.50 mm or a cell density ranging from 8,000 cells/cm$^3$ to 25,000,000 cells/cm$^3$.

37. The cylindrical closure according to claim 15, wherein the at least one thermoplastic polymer of the core member and/or the at least one thermoplastic polymer of the at least one peripheral layer comprises a low density polymer having an unfoamed density in a range from 0.7 g/cm$^3$ to 1.5 g/cm$^3$.

38. The cylindrical closure according to claim 15, wherein the at least one thermoplastic polymer of the core member is selected from one of the following groups (a) or (b):
  (a) the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluorelastomers, fluoropolymers, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers, cyclic olefin copolymers, styrene ethylene butadiene styrene block copolymers, styrene ethylene butylene styrene block copolymers, styrene ethylene butylene block copolymers, styrene butadiene styrene block copolymers, styrene butadiene block copolymers, styrene isoprene styrene block copolymers, styrene isobutylene block copolymers, styrene isoprene block copolymers, styrene ethylene propylene styrene block copolymers, styrene ethylene propylene block copolymers, polyvinylalcohol, polyvinylbutyral, polyhydroxyalkanoates, copolymers of hydroxyalkanoates and monomers of biodegradable polymers, poly(lactic acid), copolymers of lactic acid and monomers of biodegradable polymers, aliphatic copolyesters, aromatic-aliphatic copolyesters, and mixtures thereof; or
  (b) the group consisting of polyvinylalcohol, polyvinylbutyral, polyhydroxyalkanoates, copolymers of hydroxyalkanoates and monomers of biodegradable polymers, poly(lactic acid), copolymers of lactic acid and monomers of biodegradable polymers, polycaprolactone, polyglycolide, poly(3-hydroxybutyrate), poly(3-hydroxybutyrate-co-3-hydroxyvalerate), poly(3-hydroxybutyrate-co-3-hydroxyhexanoate), poly(butylensuccinate) poly(butylensuccinate-co-adipate), poly(trimethyleneterephthalate), poly(butylenadipate-co-terephthalate), poly(butylensuccinate-co-terephthalate), poly(butylensebacate-co-terephthalate), lactic acid caprolactone lactic acid copolymers, lactic acid ethylene oxide lactic acid copolymers, and mixtures thereof.

39. The cylindrical closure according to claim 15, wherein the at least one thermoplastic polymer of the core member and/or the at least one thermoplastic polymer of the at least one peripheral layer is biodegradable according to ASTM D6400.

40. The cylindrical closure according to claim 15, wherein the at least one thermoplastic polymer of the at least one peripheral layer is selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluorelastomers, fluoropolymers, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers, styrene ethylene butadiene styrene block copolymers, styrene ethylene butylene styrene block copolymers, styrene ethylene butylene block copolymers, styrene butadiene styrene block copolymers, styrene butadiene block copolymers, styrene isoprene styrene block copolymers, styrene isobutylene block copolymers, styrene isoprene block copolymers, styrene ethylene propylene styrene block copolymers, styrene ethylene propylene block copolymers, polyvinylalcohol, polyvinylbutyral, polyhydroxyalkanoates, copolymers of hydroxyalkanoates and monomers of biodegradable polymers, aliphatic copolyesters, aromatic-aliphatic copolyesters, poly(lactic acid), copolymers of lactic acid and monomers of biodegradable polymers, polycaprolactone, polyglycolide, poly(3-hydroxybutyrate), poly(3-hydroxybutyrate-co-3-hydroxyvalerate), poly(3-hydroxybutyrate-co-3-hydroxyhexanoate), poly(butylensuccinate) poly(butylensuccinate-co-adipate), poly(trimethyleneterephthalate), poly(butylenadipate-co-terephthalate), poly(butylensuccinate-co-terephthalate), poly(butylensebacate-co-terephthalate), lactic acid caprolactone lactic acid copolymers, lactic acid ethylene oxide lactic acid copolymers, and combinations of two or more thereof.

41. The cylindrical closure according to claim 15, wherein the at least one thermoplastic polymer present in the at least one peripheral layer is biodegradable according to ASTM D6400.

42. The cylindrical closure according to claim 15, wherein the at least one peripheral layer comprises a thickness ranging from 0.05 mm to 5 mm.

43. The cylindrical closure according to claim 15, wherein the at least one peripheral layer comprises a tough, score resistant, and mar resistant surface.

44. The cylindrical closure according to claim 15, wherein the at least one peripheral layer comprises a density in a range from 300 kg/m$^3$ to 1500 kg/m$^3$.

45. The cylindrical closure according to claim 1, being biodegradable according to ASTM D6400.

46. A method of closing a container, the method comprising inserting the cylindrical closure according to claim 1 into the portal-forming neck of said container.

47. The cylindrical closure according to claim 1 having an overall density from 150 kg/m³ to 500 kg/m³.

48. The cylindrical closure according to claim 1, wherein the at least one natural organic filler is comprised in an amount in a range from 10 wt. % to 70 wt. %, based on a total weight of the closure.

49. The cylindrical closure according to claim 1, wherein the at least one natural organic filler comprises particles having a particle size measured by a laser diffraction method according to ISO 13320 in a range from 1 μm to 1000 μm.

50. The cylindrical closure according to claim 31, wherein the closure is produced by a process comprising at least a process step of maintaining an extrusion temperature in a range from 120° C. to 170° C.

51. The cylindrical closure according to claim 15, wherein the core member comprises at least one of an average cell size ranging from 0.05 mm to 0.1 mm or a cell density ranging from 1,000,000 cells/cm³ to 8,000,000 cells/cm³.

52. The cylindrical closure according to claim 15, wherein the at least one peripheral layer comprises a thickness ranging from 0.1 mm to 2 mm.

53. The cylindrical closure according to claim 15, wherein the at least one peripheral layer comprises a density ranging from 750 kg/m³ to 1100 kg/m³.

54. A method for producing a cylindrical closure, the method comprising the steps of
　a. combining at least one natural organic filler with at least one thermoplastic polymer to obtain a polymer composition, wherein the at least one natural organic filler comprises at least one of the following features (i) or (ii):
　　(i) the at least one natural organic filler comprises particles having a particle size measured by a laser diffraction method according to ISO 13320 in a range from 0.1 μm to 2000 μm, or
　　(ii) the at least one natural organic filler comprises at least one ingredient selected from the group consisting of grape seed flour, grape skin powder, grape pomace flour, rice hull flour, oat hull flour, peanut hull flour, soybean hull flour, starch flour, corn starch flour, cellulose flour, microcrystalline cellulose, nanocellulose, wood flour, rice straw flour, corn cob flour, cricket flour, bagasse flour, kenaf flour, and hemp flour;
　b. adding at least one blowing agent to the polymer composition;
　c. heating the polymer composition provided in step b. to obtain a heated composition;
　d. introducing the heated composition into a mold;
　e. forming the closure inside the mold; and
　f. demolding the closure.

55. A closure produced according to the method according to claim 54.

56. A method for producing a cylindrical closure comprising at least one thermoplastic polymer and at least one natural organic filler, said method comprising the steps of:
　a. providing a core member composition comprising at least one thermoplastic polymer;
　b. adding at least one natural organic filler to the core member composition wherein the at least one natural organic filler comprises at least one of the following features (i) or (ii):
　　(i) the at least one natural organic filler comprises particles having a particle size measured by a laser diffraction method according to ISO 13320 in a range from 0.1 μm to 2000 μm, or
　　(ii) the at least one natural organic filler comprises at least one ingredient selected from the group consisting of grape seed flour, grape skin powder, grape pomace flour, rice hull flour, oat hull flour, peanut hull flour, soybean hull flour, starch flour, corn starch flour, cellulose flour, microcrystalline cellulose, nanocellulose, wood flour, rice straw flour, corn cob flour, cricket flour, bagasse flour, kenaf flour, and hemp flour;
　c. adding at least one blowing agent to the core member composition;
　d. heating the core member composition to obtain a heated composition;
　e. extruding a continuous, elongated, substantially cylindrically shaped length of the heated composition to obtain, as a core member, a continuous elongated length of the core member composition having a cylindrical surface;
　f. cutting the continuous elongated length of the core member composition obtained in method step e. in a plane substantially perpendicular to a central axis of said continuous elongated length to obtain the closure.

57. The method according to claim 56, further comprising maintaining an extrusion temperature in a range from 100° C. to 200° C.

58. A closure produced according to the method according to claim 56.

59. The method according to claim 56, further comprising a step of printing, coating, and/or post-treating the continuous elongated length of the core member composition obtained in method step e.

60. The method according to claim 56, further comprising maintaining an extrusion temperature in a range from 120° C. to 170° C.

61. A closure produced according to the method according to claim 59.

62. A method for producing a cylindrical closure comprising at least one thermoplastic polymer and at least one natural organic filler, said method comprising the steps of:
　a. providing a core member composition comprising at least one thermoplastic polymer;
　b. adding at least one blowing agent to the core member composition;
　c. heating the core member composition to obtain a heated composition;
　d. extruding a continuous, elongated, substantially cylindrically shaped length of the heated composition to obtain, as a core member, a continuous elongated length of the core member composition having a cylindrical surface;
　e. providing a peripheral layer composition comprising at least one thermoplastic polymer;
　f. extruding a separate and independent peripheral layer of the peripheral layer composition separately to, co-axially to and in intimate bonded engagement with the continuous, elongated length of the core member composition obtained in method step d., said separate and independent peripheral layer peripherally surrounding and substantially enveloping the cylindrical surface of the continuous, elongated length of the core member composition obtained in method step d. to obtain a multi-component elongated structure having a cylindrical surface; and g. cutting the multi-component elongated structure obtained in method step f. in a plane substantially perpendicular to a central axis of said multi-component elongated structure to obtain the closure.

63. The method according to claim 62, further comprising the step of printing, coating, and/or post-treating the continuous elongated length of a core member composition obtained in method step d, or the closure obtained in method step g.

64. The method according to claim 62, wherein method steps d. and f. are conducted substantially simultaneously.

65. The method according to claim 63, wherein method steps d. and f. are conducted substantially simultaneously.

66. The method according to claim 62, further comprising maintaining an extrusion temperature in a range from 100° C. to 200° C.

67. The method according to claim 62, further comprising maintaining an extrusion temperature in a range from 120° C. to 170° C.

68. A closure produced according to the method according to claim 62.

69. A closure produced according to the method according to claim 63.

70. The method according to claim 62, comprising at least one of the following steps: adding the at least one natural organic filler to the core member composition; or adding the at least one natural organic filler to the peripheral layer composition.

* * * * *